United States Patent
Harvey et al.

(10) Patent No.: US 11,915,142 B2
(45) Date of Patent: Feb. 27, 2024

(54) CREATING EQUIPMENT CONTROL SEQUENCES FROM CONSTRAINT DATA

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Salt Lake City, UT (US)

( * ) Notice: Subject to any disclaimer, the term of this patent is extended or adjusted under 35 U.S.C. 154(b) by 213 days.

(21) Appl. No.: 17/228,119

(22) Filed: Apr. 12, 2021

(65) Prior Publication Data

US 2021/0383042 A1 Dec. 9, 2021

Related U.S. Application Data

(60) Provisional application No. 62/704,976, filed on Jun. 5, 2020.

(51) Int. Cl.
*G06F 30/18* (2020.01)
*G06N 3/084* (2023.01)
(Continued)

(52) U.S. Cl.
CPC ............. *G06N 3/084* (2013.01); *F24F 11/64* (2018.01); *F24F 11/65* (2018.01); *G05B 13/027* (2013.01);
(Continued)

(58) Field of Classification Search
CPC ........ G06N 3/084; G06N 3/047; G06N 3/048; G06N 3/04; G06N 3/063; G06N 3/08; F24F 11/64; F24F 11/65; F24F 2120/10; F24F 2120/20; F24F 2140/50; G06F 30/18; G06F 30/27; G06F 9/30036; G06F 17/16; G06F 2119/08; G06F 2119/06; G05B 13/027;
(Continued)

(56) References Cited

U.S. PATENT DOCUMENTS 5,224,648 A 7/1993 Simon et al.
5,581,659 A 12/1996 Takatori
(Continued)

OTHER PUBLICATIONS

C. Zhang, S. R. Kuppannagari, R. Kannan, V. K. Prasanna, "Building HVAC Scheduling Using Reinforcement Learning via Neural Network Based Model Approximation" pp. 287-296, (Year: 2019).*
(Continued)

*Primary Examiner* — Kibrom K Gebresilassie

(57) ABSTRACT

A structure thermodynamic model, which models the physical characteristics of a controlled space, inputs a constraint state curve which gives constraints, such as temperature, that a controlled space is to meet; and outputs a state injection time series which is the amount of state needed for the controlled space to optimize the constraint state curve. The state injection time series curve is then used as input into an equipment model, which models equipment behavior in the controlled space. The equipment model outputs equipment control actions per control time (a control sequence) which can be used to control the equipment in the controlled space. Some embodiments train the models using training data.

20 Claims, 15 Drawing Sheets

(51) Int. Cl.

| | | |
|---|---|---|
| G06N 3/063 | (2023.01) | |
| G06F 9/30 | (2018.01) | |
| G06N 3/04 | (2023.01) | |
| G05B 13/02 | (2006.01) | |
| G06F 17/16 | (2006.01) | |
| G06N 3/08 | (2023.01) | |
| G06F 30/27 | (2020.01) | |
| F24F 11/64 | (2018.01) | |
| G05B 19/042 | (2006.01) | |
| F24F 11/65 | (2018.01) | |
| G06Q 10/067 | (2023.01) | |
| G05B 13/04 | (2006.01) | |
| G06N 3/047 | (2023.01) | |
| G06N 3/048 | (2023.01) | |
| G06F 119/08 | (2020.01) | |
| F24F 120/10 | (2018.01) | |
| F24F 120/20 | (2018.01) | |
| G06F 119/06 | (2020.01) | |
| F24F 140/50 | (2018.01) | |

(52) U.S. Cl.
CPC ........... *G05B 13/04* (2013.01); *G05B 19/042* (2013.01); *G06F 9/30036* (2013.01); *G06F 17/16* (2013.01); *G06F 30/18* (2020.01); *G06F 30/27* (2020.01); *G06N 3/04* (2013.01); *G06N 3/047* (2023.01); *G06N 3/048* (2023.01); *G06N 3/063* (2013.01); *G06N 3/08* (2013.01); *G06Q 10/067* (2013.01); *G06Q 50/163* (2013.01); *F24F 2120/10* (2018.01); *F24F 2120/20* (2018.01); *F24F 2140/50* (2018.01); *G05B 2219/2614* (2013.01); *G06F 2119/06* (2020.01); *G06F 2119/08* (2020.01)

(58) Field of Classification Search
CPC .................. G05B 13/04; G05B 19/042; G05B 2219/2614; G06Q 10/067; G06Q 50/163
See application file for complete search history.

(56) References Cited

U.S. PATENT DOCUMENTS

| | | | |
|---|---|---|---|
| 5,740,324 | A | 4/1998 | Mathur et al. |
| 6,119,125 | A | 9/2000 | Gloudeman et al. |
| 6,967,565 | B2 | 11/2005 | Lingemann |
| 7,447,664 | B2 | 11/2008 | Pado |
| 7,620,613 | B1 | 11/2009 | Moore et al. |
| 7,756,804 | B2 | 7/2010 | Bloom et al. |
| 8,626,700 | B1 | 1/2014 | Monraz et al. |
| 9,020,647 | B2 | 4/2015 | Johnson et al. |
| 9,258,201 | B2 | 2/2016 | McCoy et al. |
| 9,298,197 | B2 | 3/2016 | Matsuoka et al. |
| 9,557,750 | B2 | 1/2017 | Gust et al. |
| 9,664,400 | B2 | 5/2017 | Wroblewski et al. |
| 9,857,238 | B2 | 1/2018 | Malhotra et al. |
| 10,013,644 | B2 | 7/2018 | Takahashi |
| 10,094,586 | B2 | 10/2018 | Pavlovski et al. |
| 10,140,544 | B1 | 11/2018 | Zhao et al. |
| 10,545,517 | B2 | 1/2020 | Matsuoka et al. |
| 10,845,815 | B2 | 11/2020 | Palanisamy et al. |
| 10,896,679 | B1 | 1/2021 | Hu et al. |
| 2002/0152298 | A1 | 10/2002 | Kikta et al. |
| 2004/0044677 | A1 | 3/2004 | Huper-Graff et al. |
| 2008/0082183 | A1 | 4/2008 | Judge |
| 2008/0277486 | A1 | 11/2008 | Seem et al. |
| 2010/0025483 | A1 | 2/2010 | Hoeynck et al. |
| 2014/0277757 | A1 | 9/2014 | Wang et al. |
| 2014/0312128 | A1* | 10/2014 | Matsuoka ............ G05B 15/02 236/51 |
| 2016/0201934 | A1* | 7/2016 | Hester ................. F24F 11/89 700/276 |
| 2016/0313752 | A1* | 10/2016 | Przybylski ........... F24F 11/84 |
| 2017/0322579 | A1 | 11/2017 | Goparaju et al. |
| 2018/0165573 | A1 | 6/2018 | Hsu et al. |
| 2018/0202678 | A1 | 7/2018 | Ahuja et al. |
| 2018/0266716 | A1 | 9/2018 | Bender et al. |
| 2019/0018067 | A1* | 1/2019 | Kong ................. G01R 31/367 |
| 2019/0219293 | A1* | 7/2019 | Wenzel ................ G06Q 50/06 |
| 2020/0080744 | A1 | 3/2020 | Sohn et al. |
| 2020/0355391 | A1 | 11/2020 | Wenzel et al. |
| 2021/0182660 | A1 | 6/2021 | Amirguliyev et al. |
| 2021/0191342 | A1 | 6/2021 | Lee et al. |
| 2023/0034809 | A1 | 2/2023 | Lee et al. |

OTHER PUBLICATIONS

C. Zhang, S. R. Kuppannagari, R. Kannan, V. K. Prasanna, "Building HVAC scheduling using reinforcement learning via Neural Network Based Model Approximation", pp. 287-296, 2019 (Year: 2019).*

Medhi, et al., Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, et al., "Self-tuning dynamic models of HVAC system components", Energy and Buildings 40 (2008) 1709-1720.

Rao, C++ Neural Networks and Fuzzy Logic, Jun. 1, 1995, MT Books, IDG Books Worldwide, Ind.

Rios, at al., "Derivative-free optimization: a review of algorithms and comparison of software implementations", J Glob Optimizers (2013) 56;1247-1293.

Sabor, et al., "Dynamic Routing Between Capsules," NIPS'17: Proceedings of the 31st International Conference on Neural Information Processing Systems, Dec. 2017, pp. 3859-3869.

Serale, G., et al., "Model Predictive Control (MPC) for Enhancing Building and HVAC System Energy Efficiency: Problem Formulation, Applications and Opportunities," Energies 2018, 11, 631; doi:10.3390, Mar. 12, 2018.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Veelenturf, L. P. J., Analysis and applications of artificial neural networks, 1995, Prentice Hall International (UK0) Ltd, United Kingdom.

Welsh, "Ongoing Commissioning (OCx) with BAS and Data Loggers," National Conference on Building Commissioning: Jun. 3-5, 2009.

Xiao et al., "Automatic Continuous Commissioning of Measurement Instruments in Air Handling Units," Building Commissioning for Energy Efficiency and Comfort, 2006, vol. VI-1-3, Shenzhen, China.

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Gagge, et al., A Standard Predictive index of Human Response to the Thermal Environment, ASHRAE Transactions 1986, Part 2B.

Hatcher, John, "Smart Buildings get hyperaware", Smart Buildings Magazine, Aug. 24, 2020.

Mostafa et al., A Continuous-Time Recurrent Neural Network for Joint Equalization and Decoding—Analog Hardware Implementation Aspects, 2015, Ottawa University.

Nassif et al., "Self-tuning dynamic models of HVAC system components," 2008, Elsiever, Energy and Buildings 40, 1709-1720.

Nassif, Nabil, (2005), Optimization of HVAC control system strategy using two-objective genetic algorithm [microform].

Perra, et al., "Monitoring Indoor People Presence in Buildings Using Low-Cost Infrared Sensor Array in Doorways," Sensors (Basel). Jun. 2021; 21(12): 4062.

(56) References Cited

OTHER PUBLICATIONS

Qin et al., "Commissioning and Diagnosis of VAV Air-Conditioning Systems," Proceedings of the Sixth International Conference for Enhanced Building Operations, Shenzhen, China, Nov. 6-9, 2006.

Rabunal et al., Aritficial Neural Networks in Real-Life Applications, 2006, Idea Group Publishing, Hershey, PA.

Salsbury et al., "Automated Testing of HVAC Systems for Commissioning," Laurence Livermore National Laboratory, 1999, LBNL-43639.

Vanus et al., The design of an indirect method for the human presence monitoring in the intelligent building, Human-centric Computing and Information Sciences 8, Article No. 28 (2018).

Assad, et al., Back Propagation Neural Networks (BPNN) and Sigmoid Activation Function in Multi-Layer Networks, Academic Journal of Nawroz University 8(4):216, Nov. 2019.

Ferguson and Green, Deeply Learning Derivatives, arXiv:1809.02233, Oct. 14, 2018.

Guo, BackPropagation Through Time, 2013.

Jang et al., Deep neural networks with a set of node-wise varying activation functions, Neural Networks 126 (2020) 118-131.

Sharma et al., Activation Functions in Neural Networks, Intentional Journal of Engineering Applied Sciences and Technology, 2020.

Sibi P., Analysis of Different Activation Functions Using Back-Propagation Neural Networks, Journal of Theoretical and Applied Information Technology, vol. 47. No. 3., Jan. 31, 2013.

Nasruddin et al. (Optimization of HVAC system energy consumption in a building using artificial neural network and multi-objective genetic algorithm, Oct. 2018, pp. 48-57) (Year: 2018).

Singaravel et al. (Deep-learning neural-network architectures and methods: Using component-based models in building-design energy prediction, Jun. 2018, pp. 81-90) (Year: 2018).

Zhao (Steel columns under fire—a neural network based strength model, Mar. 2004, pp. 97-105) (Year: 2004).

\* cited by examiner

CREATING EQUIPMENT CONTROL SEQUENCES FROM CONSTRAINT DATA

RELATED APPLICATIONS

The present application hereby incorporates by reference the entirety of, and claims priority to, U.S. Provisional Patent Application Ser. No. 62/704,976, filed Jun. 5, 2020.

FIELD

The present disclosure relates to using machine learning models to determine optimal building equipment usage.

BACKGROUND

Building systems are the world's most complex automated systems. Even the smallest buildings easily have thousands of I/O points—or what would be called degrees of freedom in robotic analysis. In large buildings the I/O points can exceed hundreds of thousands, and with the growth of the IoT industry, the complexity is only growing. Only when buildings are given their due respect against comparative cyberphysical systems like autonomous vehicles, Mars rovers, or industrial robotics, can the conversation start on what we do to address this complexity. Buildings comprise a varied and complex set of systems for managing and maintaining the building environment. Building automation systems can be used, to a certain extent, to control HVAC systems. These systems may perform some of the complex operations required by the building to keep it within safe parameters (e.g., no pipes freezing), and to keep its occupants comfortable. However, typically, HVAC control systems are care managed retroactively—the building responds to the current state. It turns on the air conditioner when it is too hot; it turns the heater on when the building is too cold. This makes it very difficult to run building equipment to meet goals such as minimizing energy cost, minimizing equipment wear and tear, and so on. In addition to managing this rising system complexity and evolving customer demand, there is exponential growth in the diversity of applications and use cases to attempt to handle the exploding complexity.

SUMMARY

This summary is provided to introduce a selection of concepts in a simplified form that are further described below in the Detailed Description section. This summary does not identify required or essential features of the claimed subject matter.

In an embodiment, a method for creating equipment control sequences from constraint data is disclosed, comprising: accessing a constraint state curve; accessing a structure model that thermodynamically represents a controlled space; accessing an equipment model associated with the controlled space that thermodynamically represents equipment associated with the controlled space; running the structure model using a machine learning engine that accepts the constraint curve as input and outputs a state injection time series to optimize constraints associated with the constraint state curve; and running the equipment model using a machine learning engine that accepts the state injection time series as input and produces a control sequence as output.

In an embodiment, the equipment model comprises a heterogenous neural network and wherein the structure model comprises a heterogenous neural network.

In an embodiment, one can use a machine learning engine to train the equipment model with sensor data, producing a trained equipment model.

In an embodiment, using a machine learning engine to train the equipment model with sensor data comprises iteratively determining an input for the equipment model by following a gradient of the equipment model forward to a lowest cost, and taking a reverse gradient backward to corresponding inputs of the equipment model.

In an embodiment, running a constraint simulator produces a constraint value.

In an embodiment, comparing the constraint value to a perfect constraint produces a cost.

In an embodiment, using a machine learning engine to train the structure model with sensor data, produces a trained structure model.

In an embodiment, using a machine learning engine to train the structure model with sensor data further comprises using a cost function to determine difference between the model output and the sensor data.

In an embodiment, using a machine learning engine to train the structure model with sensor data comprises inputting weather data into the trained structure model.

In an embodiment, the constraint state time series comprises equipment constraint, building constraint, human constraint, material constraint, process control constraint, monetary constraint, or energy cost constraint.

In an embodiment, the controlled space comprises an automated building, a process control system, an HVAC system, an energy system, or an irrigation system.

The method of claim 1, further comprising modifying parameter values within the structure model.

In an embodiment, determining new parameter values and modifying parameter values to match the within the structure model.

In an embodiment, an automated building control system is disclosed, which comprises a controller with a processor and memory, the processor configured to perform automation building control steps which include: accessing a constraint state curve; accessing a structure model that thermodynamically represents a controlled space; accessing an equipment model associated with the controlled space that thermodynamically represents a resource associated with the controlled space; running the structure model using a machine learning engine that accepts a state injection time series as input and outputs a constraint curve and a new state injection time series to optimize the state injection time series with reference to the constraint curve; and running the equipment model using a machine learning engine that accepts a control series as input and produces state injection time series as output to optimize the control series with reference to the state injection time series.

In an embodiment, the equipment model comprises a neural network with connected neurons wherein the neurons are arranged with reference to physical equipment behavior.

In an embodiment, the control series is operationally able to control the resource associated with the controlled space.

In an embodiment, the structure model comprises a neural network with connected neurons, and wherein the neurons are arranged with reference to location of physical structures in the controlled space.

In an embodiment, the neurons have at least two separate activation functions.

In an embodiment, a computer-readable storage medium configured with data and instructions is disclosed, which upon execution by a processor perform a method of creating equipment control sequences from constraint data, the method comprising: accessing a constraint state curve; accessing a structure model that thermodynamically represents a controlled space; accessing an equipment model associated with the controlled space that thermodynamically represents a resource associated with the controlled space; running the structure model using a machine learning engine that accepts a state injection time series as input and outputs a constraint curve and a new state injection time series to optimize the state injection time series with reference to the constraint curve; and running the equipment model using a machine learning engine that accepts a control series as input and produces state injection time series as output to optimize the control series with reference to the state injection time series.

In an embodiment, the machine learning engine comprises using backpropagation that computes a cost function gradient for values in the structure model, and then uses an optimizer to update the state injection time series.

In an embodiment, the backpropagation that computes the cost function gradient uses automatic differentiation.

Additional features and advantages will become apparent from the following detailed description of illustrated embodiments, which proceeds with reference to accompanying drawings.

Figure 1:
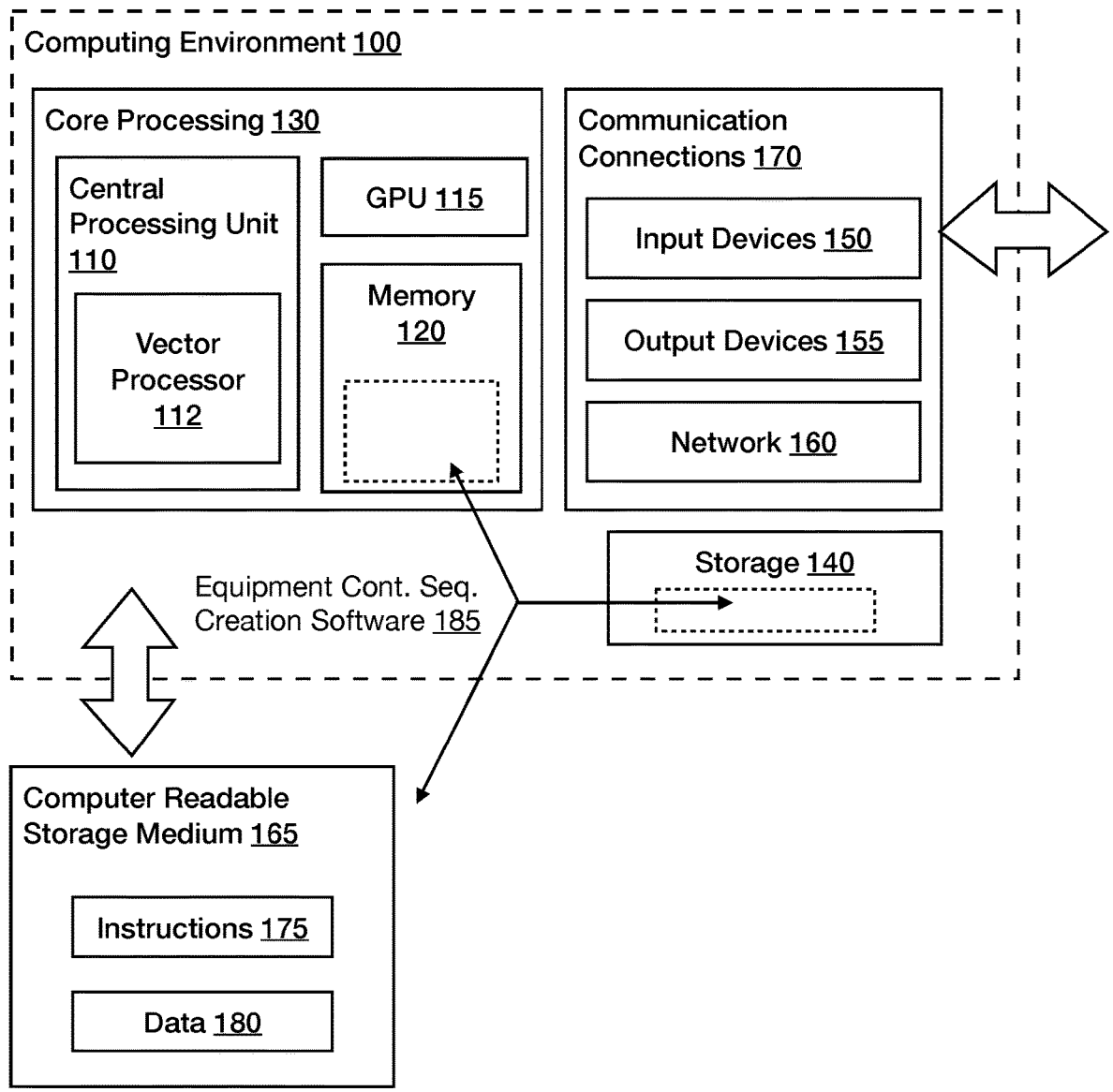
FIG. 1 depicts an exemplary computing system in conjunction in accordance with one or more implementations.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to systems and methods for building neural networks that describe controlled spaces. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages.

"Optimize" means to improve, not necessarily to perfect. For example, it may be possible to make further improvements in a value or an algorithm which has been optimized.

"Determine" means to get a good idea of, not necessarily to achieve the exact value. For example, it may be possible to make further improvements in a value or algorithm which has already been determined.

A "goal state" may read in a cost (a value from a cost function) and determine if that cost meets criteria such that a goal has been reached. Such criteria may be the cost reaching a certain value, being higher or lower than a certain value, being between two values, etc. A goal state may also look at the time spent running the simulation model overall, if a specific running time has been reached, the neural network running a specific number of iterations, and so on.

A machine learning process is one of a variety of computer algorithms that improve automatically through experience. Common machine learning processes are Linear Regression, Logistic Regression, Decision Tree, Support Vector Machine (SVM), Naive Bayes, K-Nearest Neighbors (kNN), K-Means Clustering, Random Forest, Backpropagation with optimization, etc.

An "optimization method" is a method that takes a reverse gradient of a cost function with respect to an input of a neural network, and determines an input that more fully satisfies the cost function; that is, the new input leads to a lower cost, etc. Such optimization methods may include gradient descent, stochastic gradient descent, min-batch gradient descent, methods based on Newton's method, inversions of the Hessian using conjugate gradient techniques, Evolutionary computation such as Swarm Intelligence, Bee Colony optimization; SOMA, and Particle Swarm, etc. Non-linear optimization techniques, and other methods known by those of skill in the art may also be used.

In some machine learning processes, backpropagation may be performed by automatic differentiation, or by a different method to determine partial derivatives of the neuron values within a neural network.

A "state" as used herein may be Air Temperature, Radiant Temperature, Atmospheric Pressure, Sound Pressure, Occupancy Amount, Indoor Air Quality, CO2 concentration, Light Intensity, or another state that can be measured and controlled.

I. Overview

Artificial neural networks are powerful tools that have changed the nature of the world around us, leading to breakthroughs in classification problems, such as image and object recognition, voice generation and recognition, autonomous vehicle creation and new medical technologies, to name just a few. However, neural networks start from ground zero with no training. Training itself can be very onerous, both in that an appropriate training set must be assembled, and that the training often takes a very long time. For example, a neural network can be trained for human faces, but if the training set is not perfectly balanced between the many types of faces that exist, even after extensive training, it may still fail for a specific subset; at best, the answer is probabilistic; with the highest probability being considered the answer.

Existing approaches offer three steps to develop a deep learning AI model. The first step builds the structure of a neural network through defining the number of layers, number of neurons in each layer, and determines the activation function that will be used for the neural network. The second step determines what training data will work for the given problem, and locates such training data. The third step attempts to optimize the structure of the model, using the training data, through checking the difference between the output of the neural network and the desired output. The network then uses an iterative procedure to determine how to adjust the weights to more closely approach the desired output. Exploiting this methodology is cumbersome, at least because training the model is laborious.

Once the neural network is trained, it is basically a black box, composed of input, output, and hidden layers. The hidden layers are well and truly hidden, with no information that can be gleaned from them outside of the neural network itself. Thus, to answer a slightly different question, a new neural network, with a new training set must be developed, and all the computing power and time that is required to train a neural network must be employed.

We describe herein a way to automate buildings; that is, to use neural networks to determine optimal control states for equipment (on, off, running at some intermediate value) within a physical space when given the states the physical space should be in. "Physical space" should be understood broadly—it can be a building, several buildings, buildings and grounds around it, a defined outside space, such as a garden or an irrigated field, etc. A portion of a building may be used as well. For example, a floor of a building may be used, a random section of a building, a room in a building, etc. This may be a space that currently exists, or may be a space that exists only as a design. Other choices are possible as well.

The physical space may be divided into zones. Different zones may have different sets of requirements for the amount of state needed in the zone to achieve the desired values. For example, for the state "temperature," a user Chris may like their office at 72° from 8 am-5 pm, while a user Avery may prefer their office at 77° from 6 am-4 pm. These preferences can be turned into constraint state curves, which are chronological (time-based) state curves. Chris's office constraint state curve may be 68° from Midnight to 8 am, 72° from 8 am to 5 pm, then 68° from 5 pm to midnight. The constraint curves (for a designated space, such as Chris's office), are then used in a structure model to calculate state injection time series curves, which are the amount of state that may be input into the associated zones to achieve the state desired over time. For Chris's office, that is the amount of heat (or cold) that may be pumped into their office for the 24 hour time period covered by the comfort curve, that is, a zone energy input. These zones are controlled by one or more equipment pieces, allowing state in the space to be changed. Such zones may be referred to as controlled building zones.

Once we have one or more state injection time series curves, we then use a machine learning engine to run an equipment neural network with physics-based models of the resources in the controlled space that will determine equipment control sequences (information as to when the equipment should be turned on, off, or placed in an intermediate state).

The technical character of embodiments described herein will be apparent to one of ordinary skill in the art, and will also be apparent in several ways to a wide range of attentive readers. Some embodiments address technical activities that are rooted in computing technology, such as more efficiently defining complex building systems; more efficiently running large data sets using machine learning, and more efficiently parsing building structures. Some technical activities described herein support more efficient neural networks with individual neurons providing information about a structure, rather than being black boxes, as in previous implementations. Some implementation greatly simplify creating complex structure models, allowing simulation of structures using much less computing power, and taking much less time to develop, saving many hours of user input and computer time. Technical effects provided by some embodiments include more efficient use of computer resources, with less need for computing power, and more efficient construction of buildings due to ability to model rulings with much more specificity.

FIG. 1 illustrates a generalized example of a suitable computing environment 100 in which described embodiments may be implemented. The computing environment 100 is not intended to suggest any limitation as to scope of use or functionality of the disclosure, as the present disclosure may be implemented in diverse general-purpose or special-purpose computing environments.

With reference to FIG. 1, the core processing is indicated by the core processing 130 box. The computing environment 100 includes at least one central processing unit 110 and memory 120. The central processing unit 110 executes computer-executable instructions and may be a real or a virtual processor. It may also comprise a vector processor 112, which allows same-length neuron strings to be processed rapidly. In a multi-processing system, multiple processing units execute computer-executable instructions to increase processing power and as such the vector processor 112, GPU 115, and CPU can be running simultaneously. The memory 120 may be volatile memory (e.g., registers, cache, RAM), non-volatile memory (e.g., ROM, EEPROM, flash memory, etc.), or some combination of the two. The memory 120 stores software 185 implementing the described methods of creating equipment control sequences from comfort curves.

A computing environment may have additional features. For example, the computing environment 100 includes storage 140, one or more input devices 150, one or more output devices 155, one or more network connections (e.g., wired, wireless, etc.) 160 as well as other communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. The computing system may also be distributed; running portions of the software 185 on different CPUs.

The storage 140 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 140 stores instructions for the software, such as equipment control sequence creation software 185 to implement methods of neuron discretization and creation.

The input device(s) 150 may be a device that allows a user or another device to communicate with the computing environment 100, such as a touch input device such as a keyboard, video camera, a microphone, mouse, pen, or trackball, and a scanning device, touchscreen, or another device that provides input to the computing environment 100. For audio, the input device(s) 150 may be a sound card or similar device that accepts audio input in analog or digital form, or a CD-ROM reader that provides audio samples to the computing environment. The output device(s) 155 may be a display, printer, speaker, CD-writer, or another device that provides output from the computing environment 100.

The communication connection(s) 170 enable communication over a communication medium to another computing entity. The communication medium conveys information such as computer-executable instructions, compressed graphics information, or other data in a modulated data signal. Communication connections 170 may comprise input devices 150, output devices 155, and input/output devices that allows a client device to communicate with another device over network 160. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 160 may be a combination of multiple different kinds of wired or wireless networks. The network 160 may be a distributed network, with multiple computers, which might be building controllers, acting in tandem. A computing connection 170 may be a portable communications device such as a wireless handheld device, a cell phone device, and so on.

Computer-readable media are any available non-transient tangible media that can be accessed within a computing environment. By way of example, and not limitation, with the computing environment 100, computer-readable media include memory 120, storage 140, communication media, and combinations of any of the above. Computer readable storage media 165 which may be used to store computer readable media comprises instructions 175 and data 180.

Data Sources may be computing devices, such as general hardware platform servers configured to receive and transmit information over the communications connections 170. The computing environment 100 may be an electrical controller that is directly connected to various resources, such as HVAC resources, and which has CPU 110, a GPU 115, Memory, 120, input devices 150, communication connections 170, and/or other features shown in the computing environment 100. The computing environment 100 may be a series of distributed computers. These distributed computers may comprise a series of connected electrical controllers.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 2:
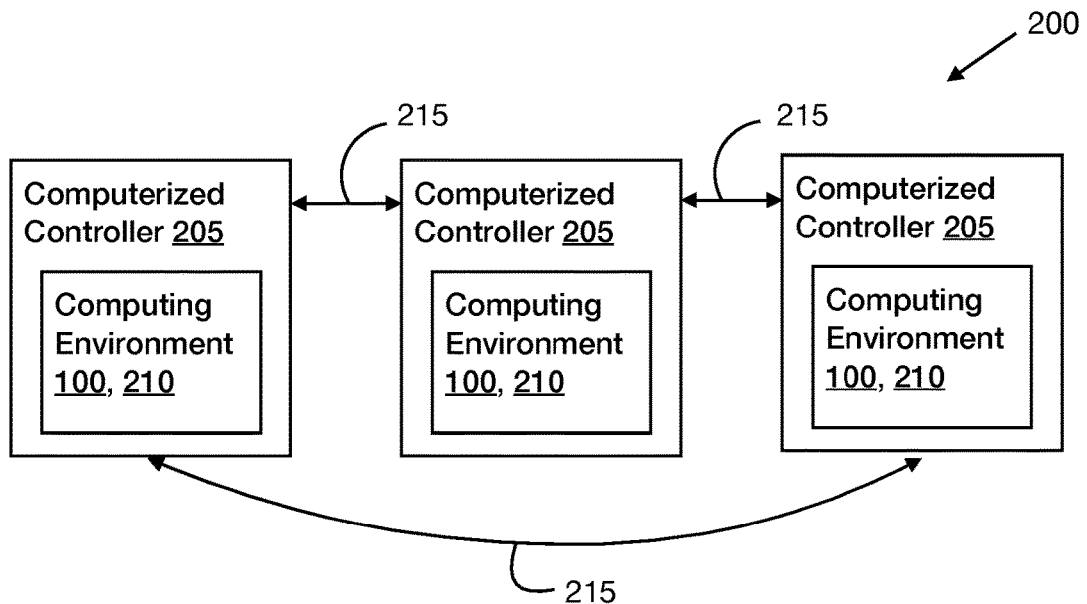
FIG. 2 depicts a distributed computing system in accordance with one or more implementations.

FIG. 2 depicts a distributed computing system 200 with which embodiments disclosed herein may be implemented. Two or more computerized controllers 205 may incorporate all or part of a computing environment 100, 210. These computerized controllers 205 may be connected 215 to each other using wired or wireless connections. These computerized controllers may comprise a distributed system that can run without using connections (such as internet connections) outside of the computing system 200 itself. This allows the system to run with low latency, and with other benefits of edge computing systems.

III. Exemplary System Embodiment

Figure 3:
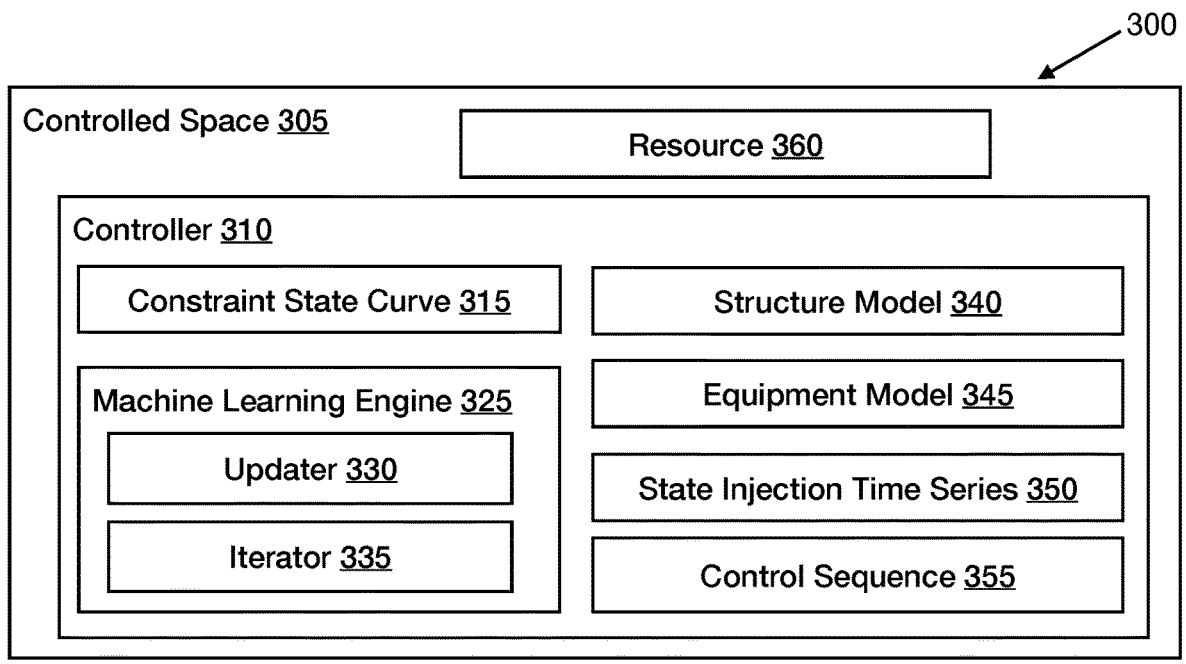
FIG. 3 depicts a system for creating equipment sequences from constraint state series curves in accordance with one or more implementations.

FIG. 3 depicts an exemplary system 300 for generating equipment control sequences from constraint state curves with a controlled space. The system may include a computer environment 100, and/or a distributed computing system 200. The system may include at least one controller 310, which may comprise a computing environment 100, and/or may be part of a computerized controller system 200. A controlled space 305 can be thought of as a space that has a resource 360 or other equipment that can modify the state of the space, such as a heater, an air conditioner (to modify temperature); a speaker (to modify noise), locks, lights, etc. A controlled space may be divided into zones, which might have separate constraint state curves. Controlled spaces might be, e.g., an automated building, a process control system, an HVAC system, an energy system, an irrigation system, a building-irrigation system, etc. The system includes at least one constraint state curve 315 that comprises desired states within a controlled space over time. This constraint state curve is generally chronological. For example, the constrain state series curve may have a time of 24 hours, and may indicate that a structure is to have a temperature (the state) of 70° for the next 8 hours, and then a temperature of 60° for the next 16 hours. That is, the temperature (state) of the controlled space is constrained to the desired values—70° for 8 hours, the 60° for 16. Many other constraints are also possible. Some of the possible constraints are discussed with reference to FIG. 12.

In some embodiments, a structure model 340 thermodynamically models a controlled space, e.g., 305. This structure model thermodynamically represents the structure in some way. It may represent the structure as a single space, or may break the structure up into different zones, which thermodynamically effect each other. The structure model may comprise neurons that represent individual material layers of a physical space and how they change state, e.g., their resistance, capacitance, and/or other values that describe how state flows though the section of the physical space that is being modeled. In some structure models, neurons representing material layers are formed into parallel and branchless neural network strings that propagate heat (and/or other state values) through them. In some embodiments, other neural structures are used. In some embodiments, structure models other than neural networks are used. More information can be found with reference to FIG. 6 and the surrounding text.

In some embodiments, an equipment model 345 thermodynamically models the resources 360 in the controlled space. The resources may be modeled as individual neurons in a neural network, with activation functions of neurons describing the physical nature of the equipment. Edges between neurons describe that equipment interacts, with weights describing equipment interaction. Equipment models are described with more specificity with reference to FIGS. 9 and 10, and the surrounding text.

The machine learning engine 325 may use an Updater 330 to update inputs within the structure 340 and the equipment 345 models. The Updater 330 is described in greater detail with reference to FIG. 13 and the surrounding text. The machine learning engine 325 may use an Iterator 335 to iteratively run a model until a goal state is reached. This iterator is described in greater detail with reference to FIG. 14 and the surrounding text.

Figure 3A:
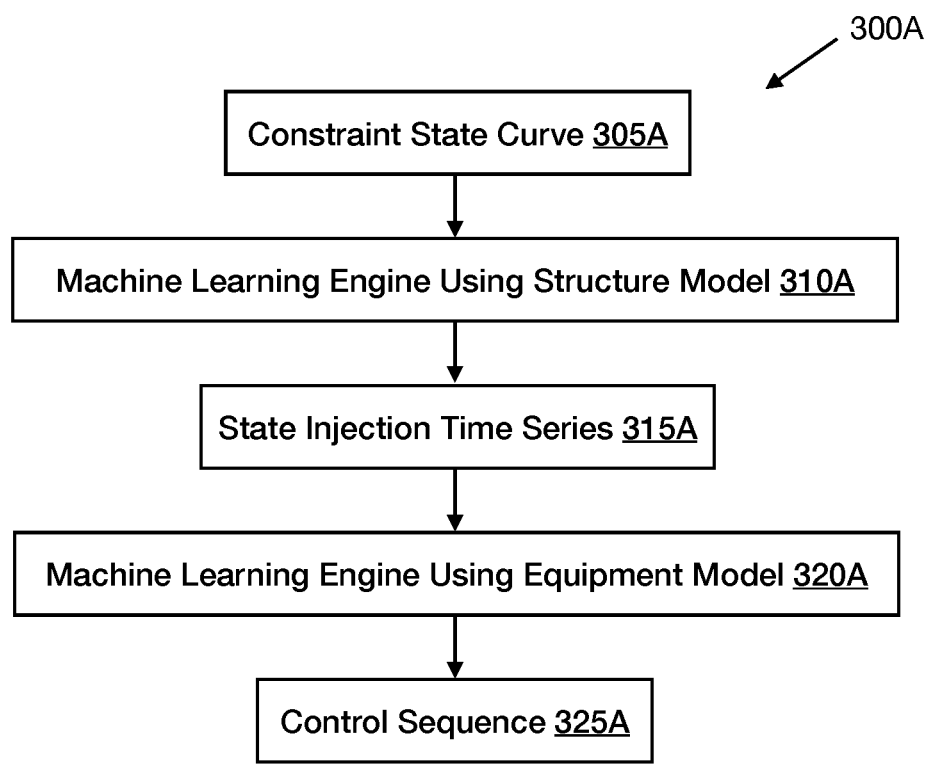
FIG. 3A depicts an overview of creating equipment sequences from constraint state series curves in accordance with one or more implementations.

FIG. 3A shows inputs and outputs of machine learning engines 300A. At a high level, a Machine Learning Engine 310A runs structure model 340 using a constraint state curve 305A as input, and outputs a state injection time series 350, 315A that fulfills the constraint state curve/time series. The state injection time series 315A is then used as input into a machine learning engine 325 that runs the equipment model 320A until it fulfills the requirements of the constraint state curve/time series. This machine learning engine 325 then outputs a control sequence 355, 325A. In some embodiments, different machine learning engines are used for the structure model 340 and the equipment model 345. A control sequence is a series of actions that a controllable resource can be instructed to take over a given time. Some control sequences are a set of on and off values, some control sequences include intermediate values, etc.

The machine learning engine 325 may be used for running structure model 340 and the equipment model 345. This comprises inputting values to the model, running the model, receiving outputted values, checking a cost function, and then determining if a goal state is reached as discussed with reference to FIGS. 5A and 5B. If a goal state has not been reached, then inputs of the structure model are modified (see FIG. 8), and then the model is run again iteratively until the goal state is reached. Rather than inputting a constraint curve for each iteration at this level, a state injection time series is input, and a simulated constraint state curve is output. The cost function determines how close the constraint state curve 315, 305A is to the simulated constraint state curve. When close enough, the last state injection time series 350, 315A used is determined to be the state injection time series output 315A.

A "cost function," generally, compares the output of a simulation model with the ground truth—a time curve that represents the answer the model is attempting to match, producing a cost. A model is generally run with the purpose of lowering the cost at each iteration, until the cost is sufficiently low, or has reached a defined threshold value, or is sufficiently high, etc. This gives us the cost—the difference between the simulated truth curve values and the expected values (the ground truth). The cost function may use a least squares function, a Mean Error (ME), Mean Squared Error (MSE), Mean Absolute Error (MAE), a Categorical Cross Entropy Cost Function, a Binary Cross Entropy Cost Function, and so on, to arrive at an answer. In some implementations, the cost function is a loss function. In some implementations, the cost function is a threshold, which may be a single number that indicates the simulated truth curve is close enough to the ground truth. In other implementations, the cost function may be a slope. The slope may also indicate that the simulated truth curve and the ground truth are of sufficient closeness. When a cost function is used, it may be time variant. It also may be linked to factors such as user preference, or changes in the physical model. The cost function applied to the simulation engine may comprise models of any one or more of the following: energy use, primary energy use, energy monetary cost, human comfort, the safety of building or building contents, the durability of building or building contents, microorganism growth potential, system equipment durability, system equipment longevity, environmental impact, and/or energy use $CO_2$ potential. The cost function may utilize a discount function based on discounted future value of a cost. In some embodiments, the discount function may devalue future energy as compared to current energy such that future uncertainty is accounted for, to ensure optimized operation over time. The discount function may devalue the future cost function of the control regimes, based on the accuracy or probability of the predicted weather data and/or on the value of the energy source on a utility pricing schedule, or the like.

Figure 4:
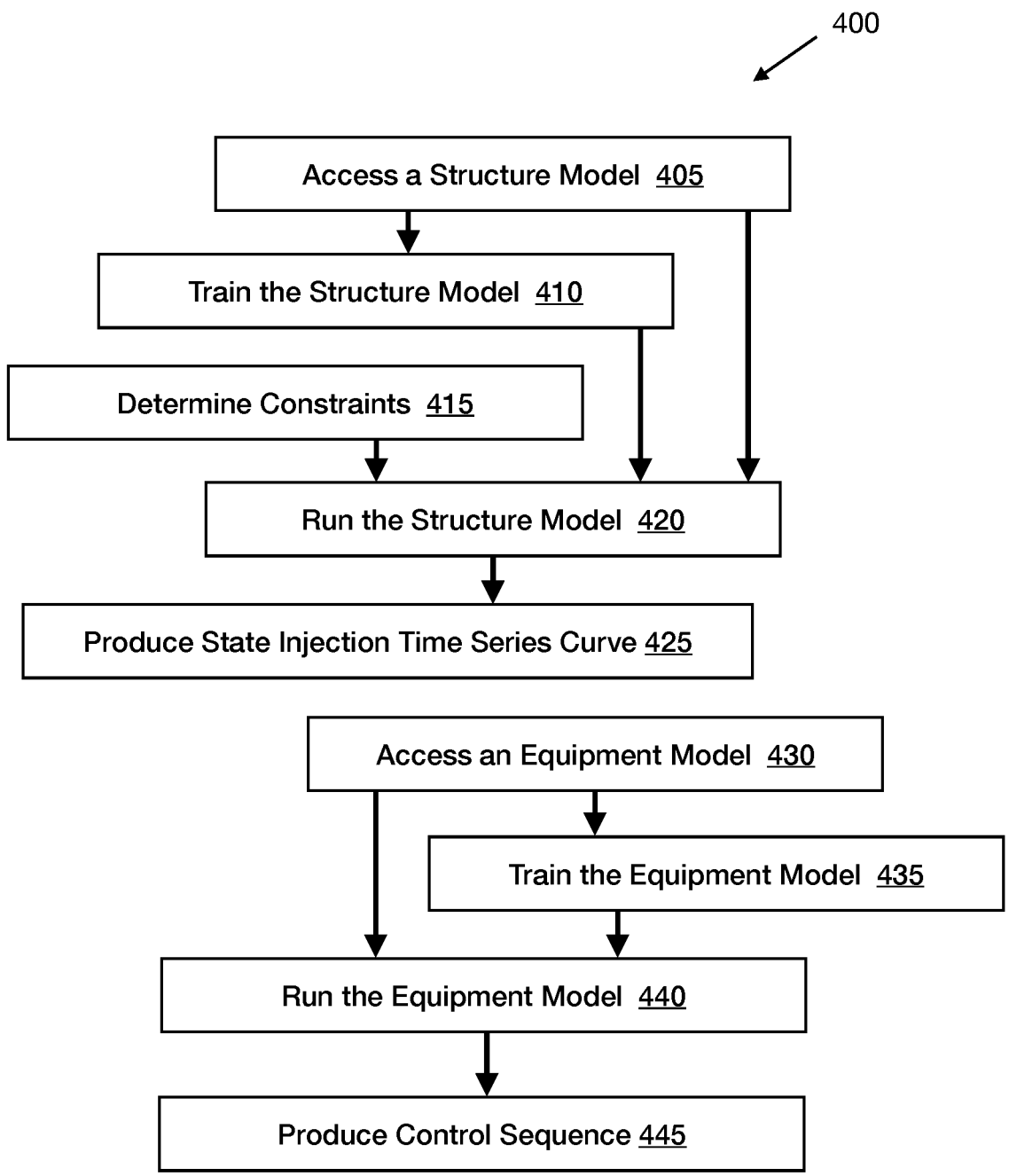
FIG. 4 depicts a method for creating equipment sequences from constraint state series curves in accordance with one or more implementations.

FIG. 4 depicts a method 400 for creating equipment sequences from constraint state series curves. The operations of method 400 and other methods presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, method 400 may be implemented in one or more processing devices (e.g., a distributed system, a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 405, a structure model is accessed. The structure that is being modeled may be an actual structure or a theoretical structure that is being modeled. The structure model thermodynamically represents the structure. It may represent the structure as a single space, or may break the structure up into different zones, which thermodynamically effect each other. The structure model may comprise neurons that represent individual material layers of a physical space and how they change state, e.g., their resistance, capacitance, and/or other values that describe how state flows though the section of the physical space that is being modeled. In some structure model neurons representing material layers are formed into parallel and branchless neural network strings that propagate heat (or other state values) through them. In some embodiments, other neural structures are used. In some embodiments, models other than neural networks are used. A suitable neural network for use in a structural model is described with reference to FIGS. 6, 7, and 8.

At operation 410, the structure model is trained. Buildings, and spaces within buildings, are unique and have their own peculiarities that are not entirely reflected by a bare recitation of building characteristics, no matter how detailed. Buildings are slow to change state, and state changes depend on external factors such as weather, so determining if a building is behaving correctly can be a long, tedious process. As everything in a building is thermodynamically connected, it can be very difficult to tell if the building is acting as designed, as a thermostat, say, placed in the zone next to where it should be will heat up not only that incorrect zone but also will provide heating to the correct zone too. These sorts of errors can be very difficult to determine without a full thermodynamic model of a building. To understand the idiosyncrasies of a specific structure, the neural model may be refined using actual building behavior (or, in some instances, simulated building behavior). This is discussed more fully with reference to FIG. 11 and the associated text.

At operation 415 constraints for a structure model are determined. Determining constraints is described in greater detail with reference to FIG. 12. These constraints may take the form of constraint state curves 305A.

At operation 420 the structure model is run. Running the structure model is described in more detail with reference to FIG. 5B.

Running the structure model 420 produces a state injection time series curve 425 that gives the amount of energy over time that should be provided by an equipment model. This state injection time series curve 425 may be used as input for the equipment model.

At operation 430, an equipment model is accessed. This equipment model comprises a thermodynamic model of the equipment in the structure. This is discussed more fully with reference to FIGS. 9 and 10 and the associated text.

At operation 435, the equipment model is trained. Equipment, such as sensors, HVAC equipment, sound systems, solar arrays, irrigation equipment, etc. is unique and each have their own peculiarities that are not entirely reflected by a bare recitation of equipment characteristics, no matter how detailed. Equipment state changes depend on state in a space as well as state of other resources, so determining if equipment is behaving correctly can also be a long, tedious process. As everything in a building is thermodynamically connected, including the equipment, it can be very difficult to tell if the equipment is acting as designed, as a heater, for example, may not have an internal sensor; rather whether it is working can only be determined by how quickly it heats up a given space. To understand the idiosyncrasies of equipment within a structure, an associated machine learning engine may be refined using actual measured equipment behavior (or, in some instances, simulated equipment behavior). This is described more fully with reference to FIG. 5C.

At operation 440, the equipment model is run. Running the equipment model comprises accepting the state injection time series from the structure model as input. Machine learning techniques are then used to produce control sequence 445. These control sequences will give instructions to run equipment associated with the structure for the designated time period. That is, the control sequences will tell equipment when to turn on, turn off, and turn to intermediate states. This is described more fully with reference to FIG. 5D.

Running an equipment model 440 produces as output 445 a control sequence (i.e., an equipment actions per control as a time sequence). This is explained more fully with reference to FIG. 10.

Figure 5A:
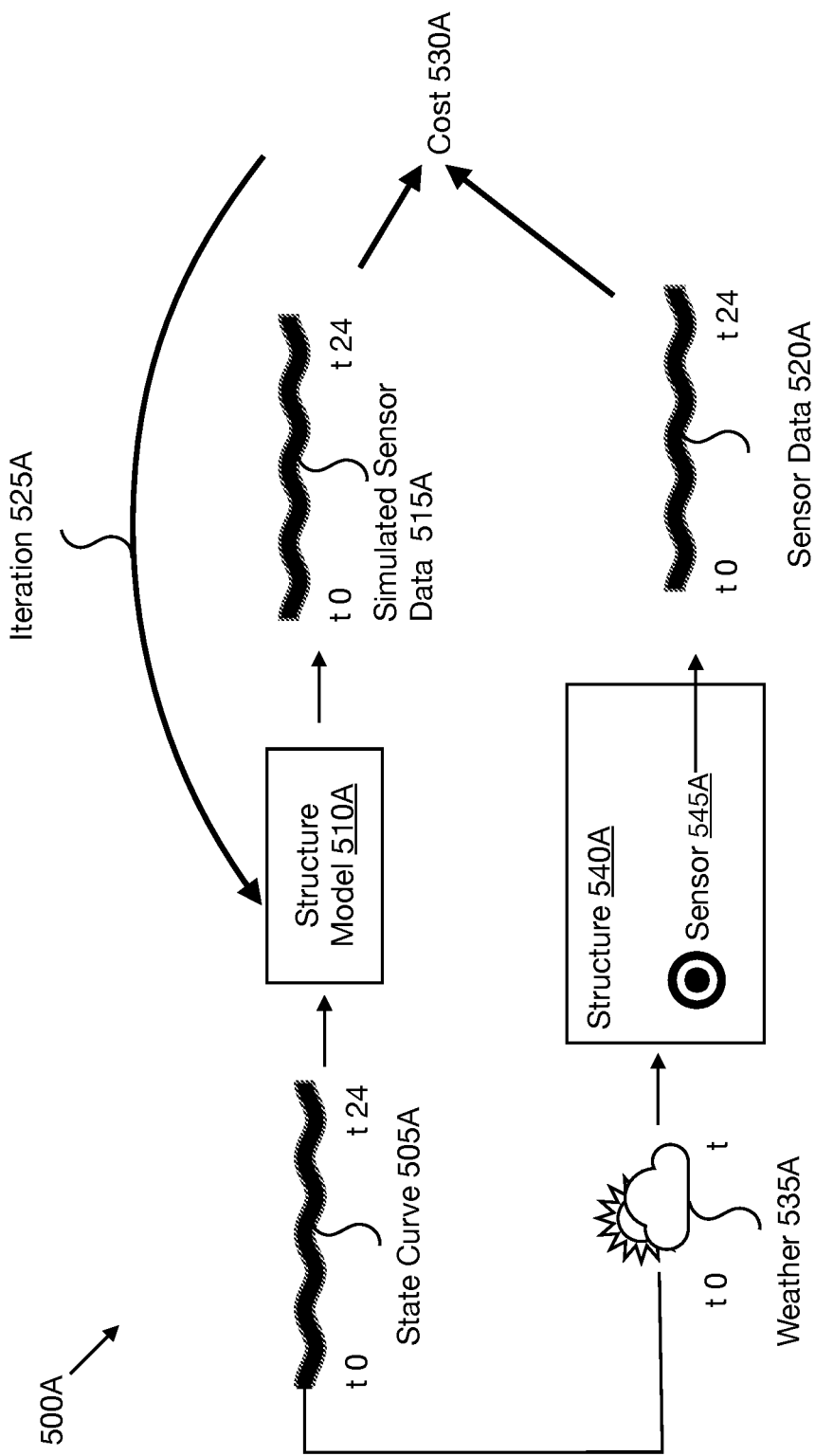
FIG. 5A is a flow diagram that depicts training a structure model in accordance with one or more implementations.
Figure 6:
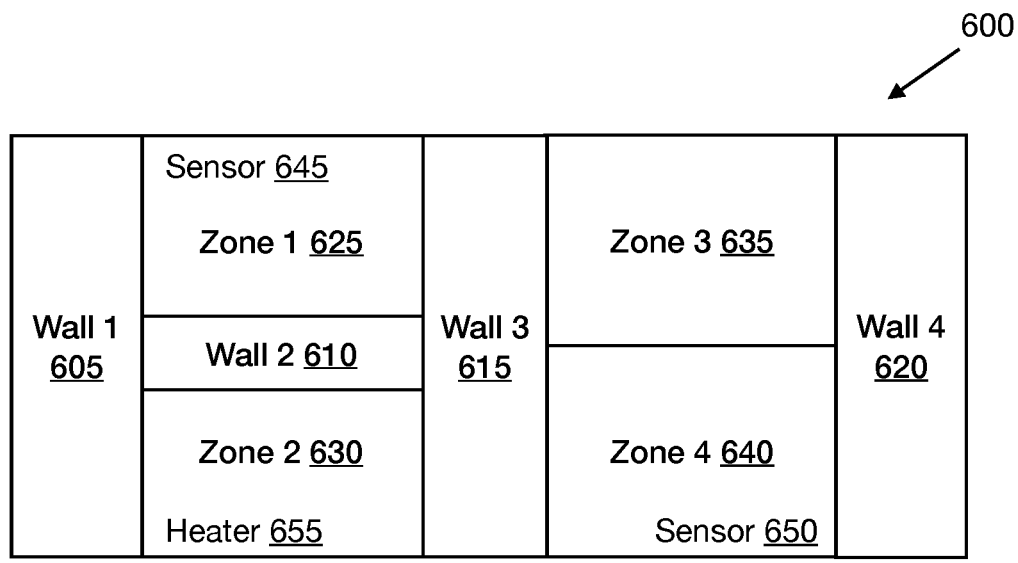
FIG. 6 depicts a controlled space in accordance with one or more implementations.

FIG. 5A discloses a flow diagram 500A that describes running a machine learning engine to train a structure model in more detail. A structure 540A, such as a building, may have sensors 545A that record actual sensor data 520A in a given location at certain times, such as from time t0 to t24. With reference to FIG. 6, such a location may be sensor 645 within zone 1 625. Outside state, such as weather 535A that affect the structure may also be recorded at the same time, e.g., t0 to t24. A structure model 510A may be run using the one or more state curves (e.g. representing the weather 535A or other outside state) 505A as input. The structure model may then produce output that represents a time series of structure values that are equivalent to the locations in the structure model that correspond to the sensor values 520A for the same time series (e.g., t0 to t24). The actual sensor values from the measured time (e.g., t0 to t24) 520A are compared with the simulated sensor values 515A to produce a cost 530A. The cost describes the difference between the values. The cost is used to backpropagate through the structure model to a section of the parameters. Partial derivatives flow backward through whatever the forward path was. So if the end of the forward flow was a cost calculation, the gradients flow back along the same path, through the comfort simulation, to the structure model 510A. These parameters that are backpropagated to represent structure values that describe the thermodynamic aspects of the structure 540A, such that changing the parameters changes the way the structure model behaves thermodynamically. The model is then run iteratively 525A with the same input 505A to hone the behavior of the structure model so that its equivalent sensor values match (within a margin of error) those of the actual sensor values 545A in the Structure 540A being modeled. This is also described with relation to FIG. 11.

Figure 5B:
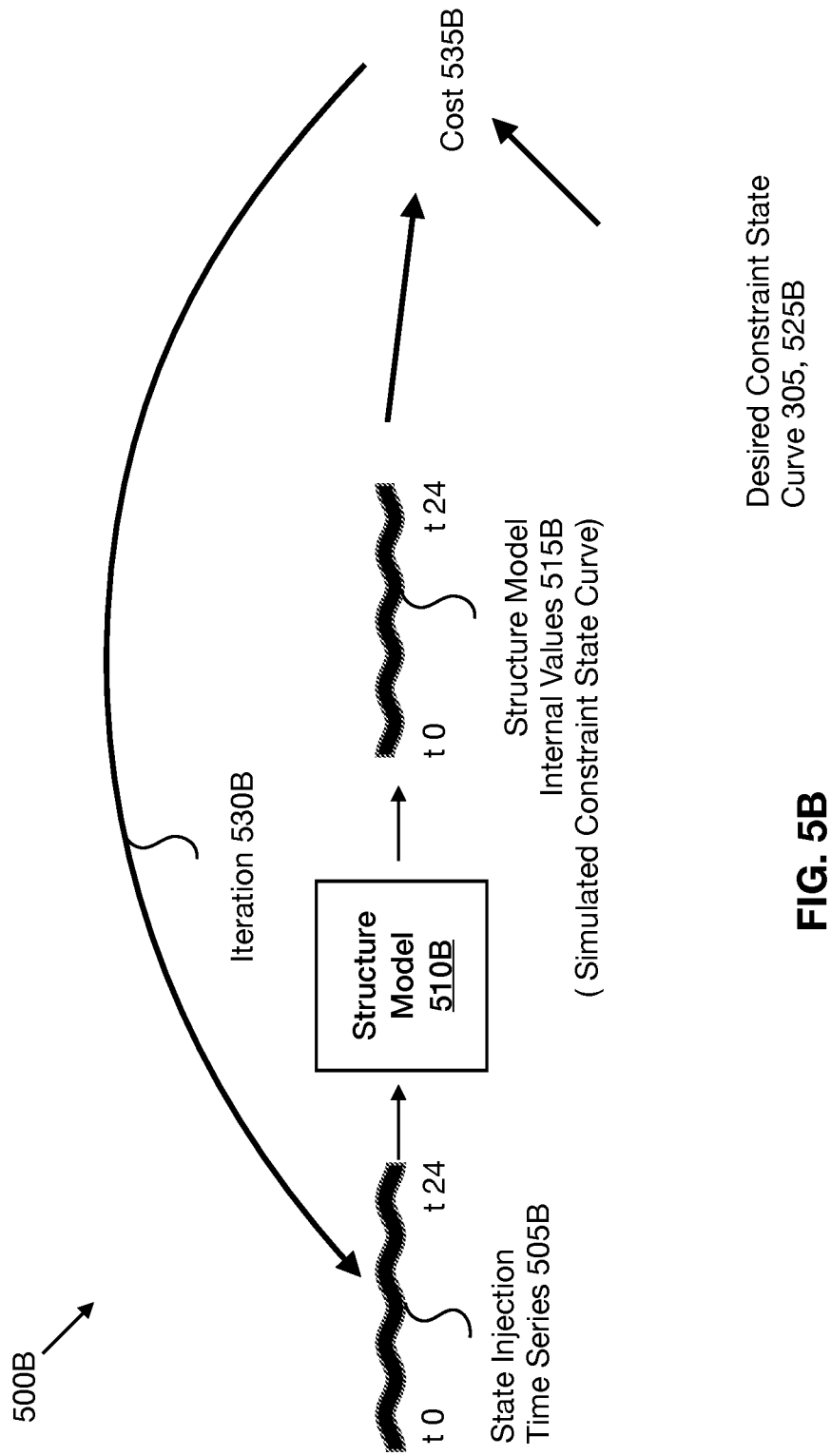
FIG. 5B is a flow diagram that depicts running a structure model in accordance with one or more implementations.

FIG. 5B discloses a flow diagram 500B that describes a machine learning process for running a structure model in more detail. The machine learning engine takes as input a constraint state curve 305, and returns a state injection time series 315. However, within the machine learning engine, each iteration 530B of the process inputs a state injection time series 505B, runs it through a forward path in the structure model 510B, and outputs a simulated constraint state curve 515B. A cost 535B is determined based on how close the simulated constraint state curve 515B is to the desired constraint state curve 305, 525B. Partial derivatives are determined backward through the forward path taken through the structure model 510, with a new state injection time series 505B being determined that is closer to the desired constraint state curve 305, 525B. This path is iterated until the simulated constraint state curve 515B is close enough to the ground truth 525B. The last state injection time series 315, 505B then becomes the output of the machine learning engine. A "cost function," generally, compares the output of a simulation model with the ground truth—a time curve that represents the answer the model is attempting to match. This gives us the cost—the difference between the simulated truth curve values and the expected values (the ground truth). The cost function may use a least squares function, a Mean Error (ME), Mean Squared Error (MSE), Mean Absolute Error (MAE), a Categorical Cross Entropy Cost Function, a Binary Cross Entropy Cost Function, and so on, to arrive at the answer. In some implementations, the cost function is a loss function. In some implementations, the cost function is a threshold, which may be a single number that indicates the simulated truth curve is close enough to the ground truth. In other implementations, the cost function may be a slope. The slope may also indicate that the simulated truth curve and the ground truth are of sufficient closeness. When a cost function is used, it may be time variant. It also may be linked to factors such as user preference, or changes in the structure or equipment model, such as when they are trained, changing internal parameters. The cost function applied to the machine learning engine may comprise models of any one or more of the following: energy use, primary energy use, energy monetary cost, human comfort, the safety of building or building contents, the durability of building or building contents, microorganism growth potential, system equipment durability, system equipment longevity, environmental impact, and/or energy use $CO_2$ potential. The cost function may utilize a discount function based on discounted future value of a cost. In some embodiments, the discount function may devalue future energy as compared to current energy such that future uncertainty is accounted for, to ensure optimized operation over time. The discount function may devalue the future cost function of the control regimes, based on the accuracy or probability of the predicted weather data and/or on the value of the energy source on a utility pricing schedule, or the like.

Figure 5C:
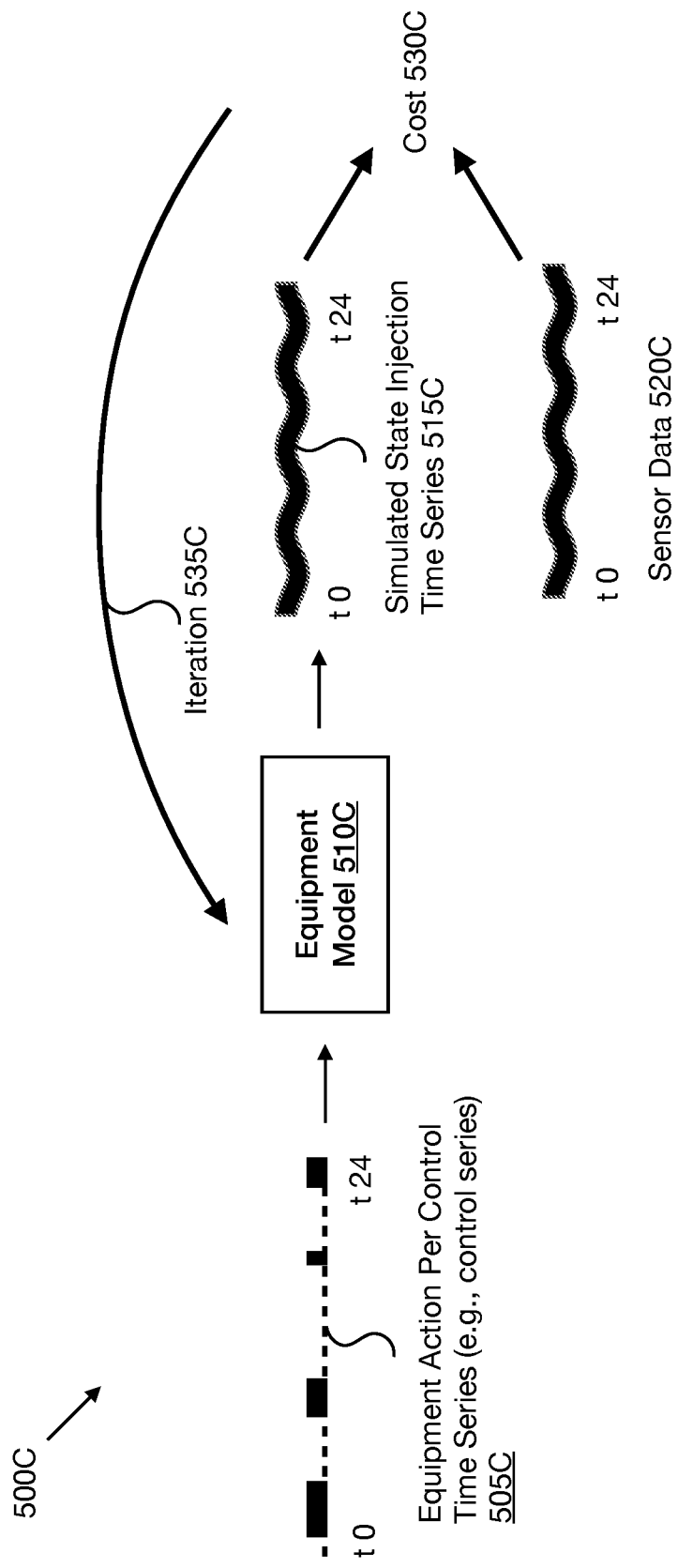
FIG. 5C is a flow diagram that depicts training an equipment model in accordance with one or more implementations.

FIG. 5C discloses a flow diagram 500C that describes machine learning engine for training an equipment model in more detail. To train an equipment model 510C, the equipment being modeled is run for a given time (here, t0 to t24). Sensor data 520C associated with the equipment is collected at the same time. The equipment action per control time series (e.g. a control series) 505C is also saved for the same time (e.g., t0 to t24). The equipment action per control 505C is then fed into the equipment model 510C by a machine learning engine. The Equipment model 510C produces a simulated state injection time series 515c. This describes how the equipment model changed state when the modeled equipment was run. The simulated state injection time series 515C is then compared to the sensor data 520C using a cost function 530C. The machine learning engine then back-propagates through the model to a set of variables that control how the equipment behaves, that is, the variables that control physical properties of the equipment. They are then modified to incrementally reduce the cost 530C. During training the equipment model is run with the same equipment action per control time series 505C.

Figure 5D:
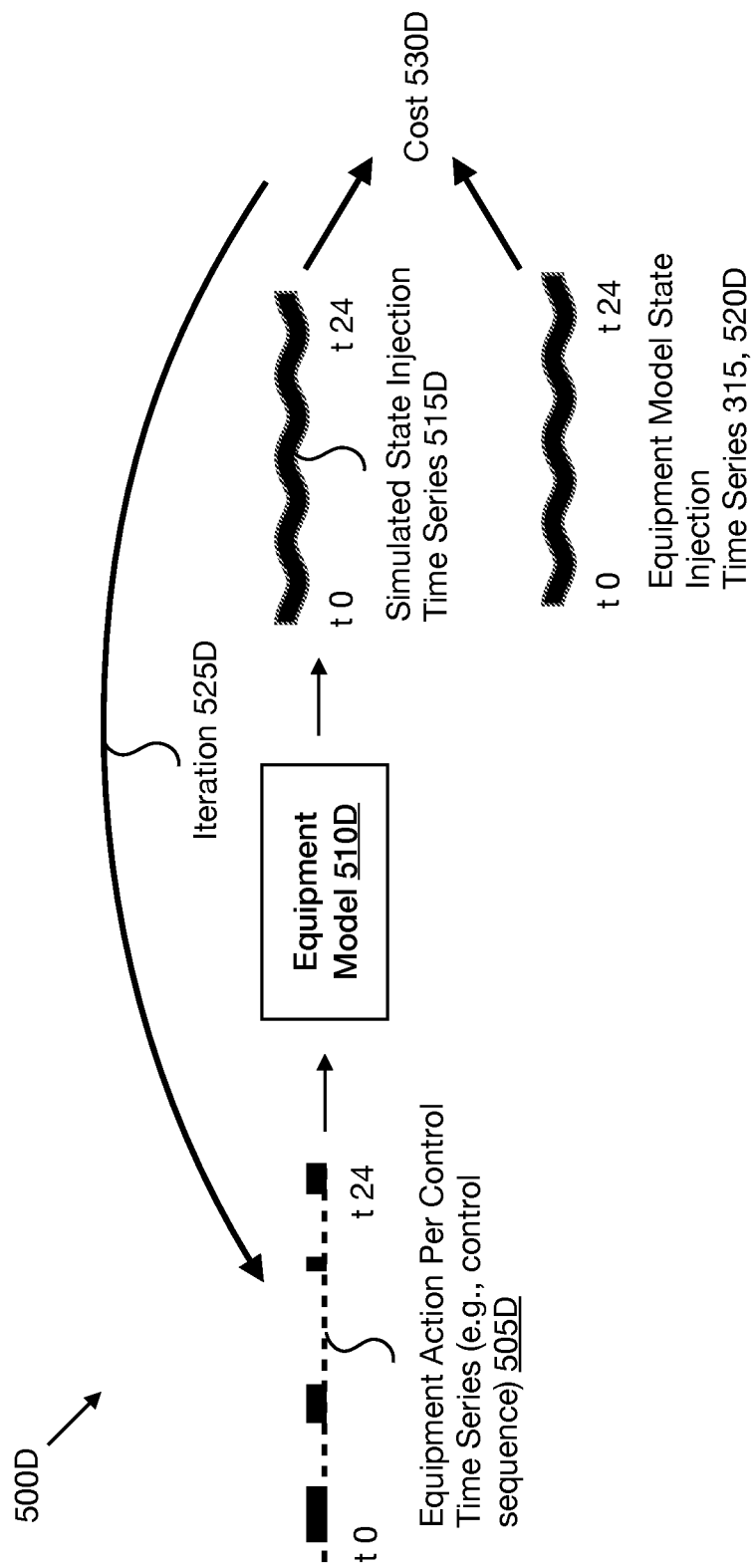
FIG. 5D is a flow diagram that depicts running an equipment model in accordance with one or more implementations.

FIG. 5D discloses a flow diagram 500D that describes a machine learning process for running an equipment model in more detail. The machine learning engine takes as input a state injection time series 315, and returns an equipment control sequence 325A. However, within the machine learning engine, an iteration 525D of the process inputs an equipment action per control time series (e.g., a control sequence) 505D, runs it through a forward path in the equipment model 510D, and outputs a simulated state injection time series 515D. A cost function 530D is determined based on how close the simulated state injection time series 515D is to the state injection time series produced by the structure model 315, 520D. Partial derivatives are determined backward through the forward path taken through the structure model 510D, with a new control sequence 505D being determined that is incrementally closer to the structure model state injection time series 315, 520D. This iteration path 525D to 505D to 510D to 515D to 530D; then back through 510D to 505D to determine a new control sequence) is continued until the simulated state injection time series 515D is close enough to the structure model state injection time series 315, 520D, as determined by a cost 530D. The last iterated control sequence 505D then becomes the output of the equipment machine learning engine. This control series that is output can then be used to run a resource (e.g., 360, 900) in a controlled space that optimizes the constraint curve requested.

FIG. 6 depicts a controlled space 600 whose behavior can be determined by using a neural network. A portion of a structure 600 is shown which comprises a Wall 1 605. This Wall 1 605 is connected to a room which comprises Zone 1 625. This zone also comprises a sensor 645 which can determine state of the zone. Wall 2 610 is between Zone 1 625 and Zone 2 630. Zone 2 does not have a sensor. Wall 3 615 is between the two zones 1 625 and 2 630 and the two zones Zone 3 635 and Zone 4 640. Zone 3 and Zone 4 do not have a wall between them. Zone 4 has a sensor 650 that can determine state in Zone 4. Zones 3 635 and Zone 4 640 are bounded on the right side by Wall 4 620. Zone 2 630 has a heater 655, which disseminates heat over the entire structure. The zones 1-4 are controlled building zones, as their state (in this case heat) can be controlled by the heater 655.

Figure 7:
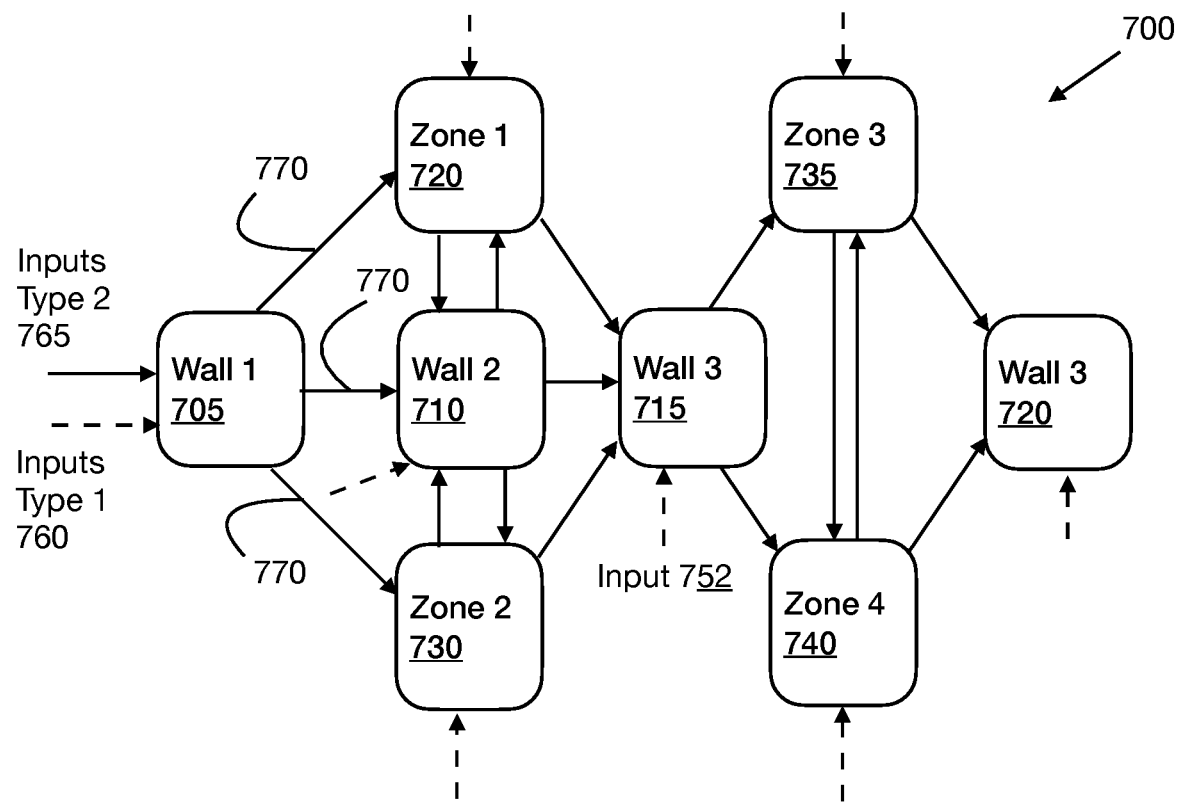
FIG. 7 depicts a neural network in accordance with one or more implementations.

FIG. 7 depicts a heterogenous neural network structure model 700 that may be used to model behaviors of the simplified controlled space of FIG. 6. In some embodiments, areas of the structure are represented by neurons that are connected with respect to the location of the represented physical structure. The neurons are not put in layers, as in other types of neural networks. Further, rather than being required to determine what shape the neural network should be to best fit the problem at hand, the neural network configuration is, in some embodiments, determined by a physical layout; that is, the neurons are arranged topologically similar to a physical structure that the neural net is simulating.

For example, Wall 1 605 is represented by neuron 705. This neuron 705 is connected by edges 770 to neurons representing Zone 1 720, Wall 2 710, and Zone 7 730. This mirrors the physical connections between Wall 1 605, Zone 1 625, Wall 2 610, and Zone 2 630. Similarly, the neurons for Zone 1 720, Wall 2 710, and Zone 2 730 are connected by edges to the neuron representing Wall 3 715. The neuron representing Wall 3 715 is connected by edges to the neurons representing Zone 3 735 and Zone 4 740. Those two neurons 735, 740 are connected by edges to the neuron representing Wall 3 715. Even though only one edge is seen going from one neuron to another neuron for clarity in this specific figure, a neuron may have multiple edges leading to another neuron, as will be discussed later. Neurons may have edges that reference each other. For example, edges 770 may be two-way.

In some implementations, the edges have inputs that are adjusted by activation functions within neurons. Some inputs may be considered temporary properties that are associated with the controlled space, such as temperature. In such a case, a temperature input represented in a neural network 700 may represent temperature in the corresponding location in the controlled space 600, such that a temperature input in Neuron Zone 1 720 can represent the temperature at the sensor 645 in Zone 1 625. In this way, the body of the neural net is not a black box, but rather contains information that is meaningful (in this case, a neuron input represents a temperature within a structure) and that can be used.

In some implementations, inputs may enter and exit from various places in the neural network, not just from an input and an output layer. This can be seen with inputs of type 1 (e.g. 760), which are represented as the dashed lines entering the neurons. Inputs of type 2 (e.g. 765) are represented as the straight lines. In the illustrative example, each neuron has at least one input. For purposes of clarity not all inputs are included. Signals, (or weights) passed from edge to edge, and transformed by the activation functions, can travel not just from one layer to the layer in a lock-step fashion, but can travel back and forth between layers, such as signals that travel along edges from the Zone 1 neuron 720 to then Wall 2 neuron 710, and from there to the Zone 2 neuron 730. Further, there may be multiple inputs into a single neuron, and multiple outputs from a single neuron. For example, a system that represents a building may have several inputs that represent different states, such as temperature, humidity, atmospheric pressure, wind, dew point, time of day, time of year, etc. These inputs may be time curves that define the state over time. A system may have different inputs for different neurons.

In some implementations, outputs are not found in a traditional output layer, but rather are values within a neuron at any location in the neural network. Such values may be located in multiple neurons. For example, the neuron associated with Zone 1 720 may have a temperature value that can be viewed at the timesteps of a model run, creating temperature time curves that represent the temperature of the corresponding physical Zone 1 625.

In some embodiments, activation functions in a neuron transform the weights on the upstream edges, and then send none, some, or all of the transformed weights to the next neuron(s). Not every activation function transforms every weight. Some activation functions may not transform any weights. In some embodiments, each neuron may have a different activation function. In some embodiments, some neurons may have similar functions. These neurons understand what each of the objects (wall, window, ceiling, etc.), are, understand their allowable inputs and outputs and comprise physics equations which describe them. Simply put, a "wall" is labeled, has a format, understands the purpose of a wall, and how the wall relates to the rest of the system. Furthermore, the wall (for example), understands the packets of substance (quanta) exchanged between objects. A wall exchanges packets of air, humidity, etc. between the inside and outside of the wall, for example.

Figure 8:
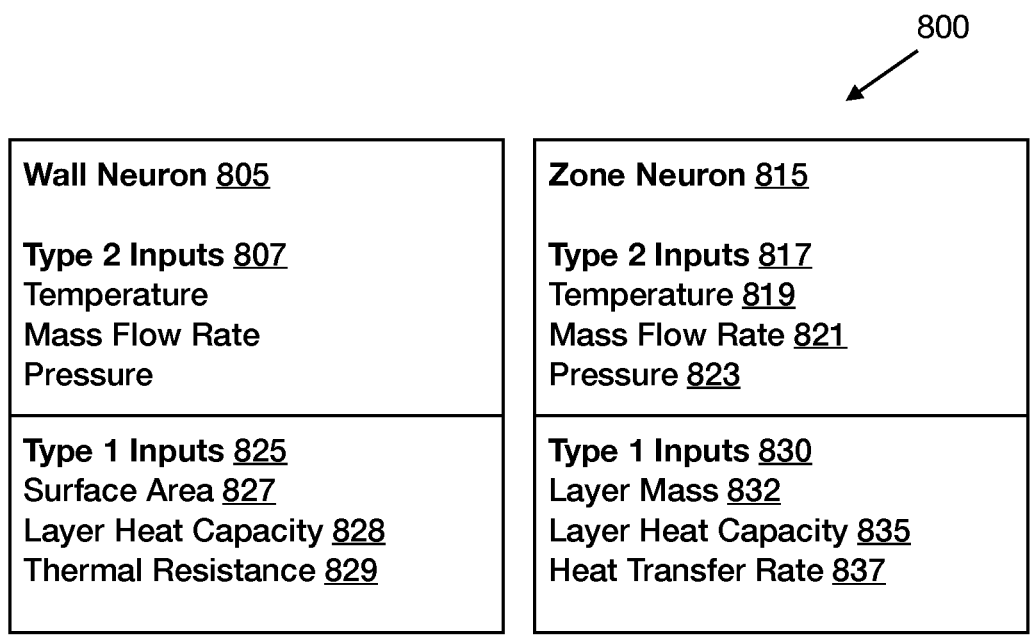
FIG. 8 depicts a block diagram of possible neuron parameters in accordance with one or more implementations.

FIG. 8 is a block diagram 800 describing possible inputs and outputs of neurons. Neural networks described herein may not have traditional input and output layers. Rather, neurons may have internal values that can be captured as output. Similarly, a wide variety of neurons, even those deep within a neural net can be used for input. For example, Chris's office may be in Zone 4 640. This zone may be represented by a neuron 740 that is somewhere in the middle of a neural network 700. A zone neuron 815 may have an activation function that is comprised of several equations that model state moving through the space. The space itself may have inputs associated with it, e.g., Layer Mass 832, Layer Heat Capacity 835, and Heat Transfer Rate 837, to name a few. For the purposes of this disclosure, we are calling these type 1 inputs 825, 830. The neuron may also have temporary values that flow through the neural network, that may be changed by the neuron's activation function. These type 2 inputs 807, 817 may be qualities such as Temperature 819, Mass Flow Rate 821, Pressure 823, etc. Different neurons may have different values. For example a Wall Neuron 805 may have Type 1 inputs 825 such as Surface Area 827, Layer Heat Capacity 828, and Thermal Resistance 829, as well as Type 2 inputs 807. An output of the neural network 800 may comprise a value gathered from among the variables in a neuron. The Zone 4 neuron representing Chris's office may have a temperature value The output of the heterogenous model 305 may be a time series of the zone neuron temperature. A neuron may have multiple inputs, and multiple outputs.

A cost function can be calculated using these internal neural net values. A cost function (also sometimes called a loss function) is a performance metric on how well the neural network is reaching its goal of generating outputs as close as possible to the desired values. To create the cost function we determine the values we want from inside the neural network, retrieve them, then make a vector with the desired values; viz: a cost C=(y,0) where y=desired values, and 0=network prediction values. These desired values are sometimes called the "ground truth." With reference to FIG. 6, Zone 1 625 has a sensor 645 which can record state within the zone. Similarly, Zone 4 640 has a sensor 650 which can also record state values. In some embodiments, desired values may be synthetic, that is, they are the values that are hoped to be reached. In some embodiments, the desired values may be derived from actual measurements.

Continuing the example from FIG. 6, this example shows two sensors that gather sensor data. The desired sensor values are time series of the actual temperatures from the sensors. In the instant example, the desired values are data from the sensors 645 and 650. The network prediction values are not determined from a specific output layer of the neural network, as the data we want is held within neurons within the network. The zone neurons 815 in our sample model hold a temperature value 819. The network prediction values to be used for the cost function are, in this case, the values (temperature 819) within the neuron 720 that corresponds to Zone 625 (where we have data from sensor 645) and the values (temperature 819) within the neuron 740 that correspond to Zone 4 640, with sensor 650.

When the model is run, a record of the temperature values from locations equivalent to the desired sensors can be accumulated from time t0 to tn. These may be time series of values equivalent to sensors 515A, e.g., simulated sensor values. Once we have the network prediction values and the desired values, we can calculate the cost function, which quantifies the error between what the model predicts and what the real word values are (the desired values). The cost function is presented as a value, a vector, or something else.

The networks described herein may be heterogenous neural networks. Heterogenous neural networks comprise neural networks that have neurons with different activation functions. These neurons may comprise virtual replicas of actual or theoretical physical locations. The activation functions of the neurons may comprise multiple equations that describe state moving through a location associated with the neuron. In some embodiments, heterogenous neural networks also have neurons that comprise multiple variables that hold values that are meaningful outside of the neural network itself. For example, a value, such as a temperature value (e.g., 819) may be held within a neuron (e.g., 740) which can be associated with an actual location (e.g., 640).

Figure 9:
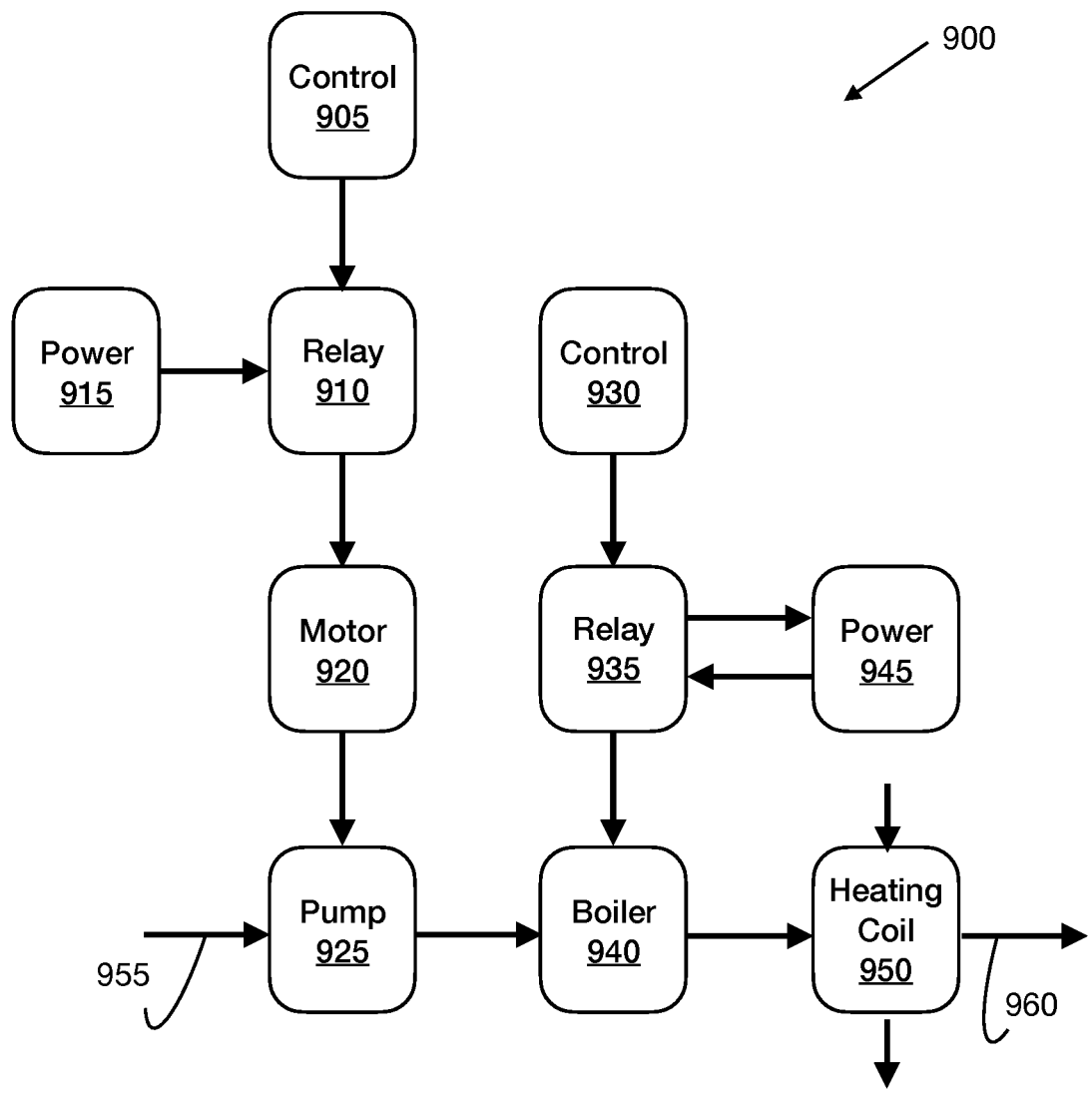
FIG. 9 depicts a simplified resource layout in accordance with one or more implementations.

FIG. 9 depicts a controlled space 900 whose behavior can be determined by using an equipment model. The system understands, for example, what a "pump" is. It, for example, is a transport the moves a substance, water, from one place to another. Fans move air, conveyers move boxes, etc. Buffer tanks, batteries, sand beds and flash drives are all stores. Other objects can be described based on their function. Because the system understands what the objects are, it can discern a purpose in the object, and so knows how to handle it in regards to the rest of the system.

On with the example, the controlled space 900 comprises a simple heating system comprising a pump 925, a boiler 940, and a heating coil 950 that produces hot air 960. The pump itself comprises a control 905 to send a signal to turn the pump on to a relay 910, which then sends power to a motor 920, that drives a pump 925. The pump 925 sends water 955 to a boiler 940, which is likewise turned on by a control 930-relay 935-power 945 system. The boiler then sends hot water to a heating coil 950, which transforms the hot water into hot air 960.

Figure 10:
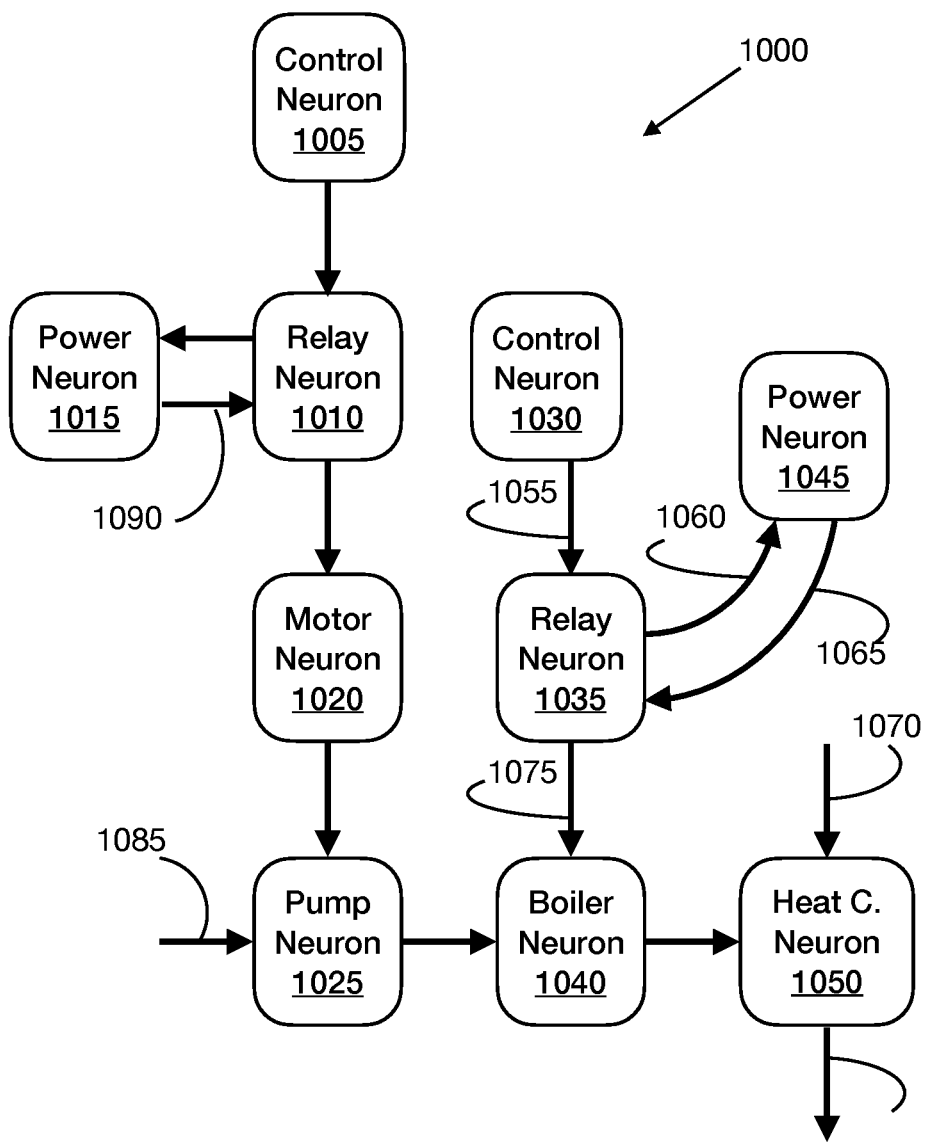
FIG. 10 depicts a neural network in accordance with one or more implementations.

At 430 an equipment model is accessed. FIG. 10 depicts a heterogenous neural network equipment model 1000 that may be used to model behaviors of the controlled space of FIG. 9. Neurons are placed in locations with reference to the physical equipment behavior, such that the control neuron 1005 is connected to relay neuron 1010, the relay neuron is connected to Power neuron 1015. Relay neuron 1010 is also connected to motor neuron 1020 and pump neuron 1025. When the control neuron 1005 receives an input to turn on, that information is relayed through the relay neuron 1010, which signals the power neuron 1015 to turn on, and signals the motor neuron 1020 to turn on. This, in turn, signals the pump neuron 1025 to turn on. The power neuron 1015 may, for example, send a voltage signal 1090 to the relay neuron 1010, which may pass the voltage signal 1090 on to the motor neuron 1020. An activation function of the motor neuron 1020 may have associated with it a series of equations that take the signal from the relay neuron and turn it into mechanical rotation for the pump neuron 1025 to use. The pump neuron 1025 may also have a water input 1085 with its own properties. Similarly, the control neuron 1030, when input with an "on," or some other method to indicate an on action, will turn on the boiler neuron 1040 through passing on an "on" 1055 to a relay neuron 1035, which then turns on the power neuron 1045 through variables sent through edge 1060. Power neuron 1045 then passes variables indicating electricity along edge 1065 through the relay neuron 1035 edge 1075 to the boiler neuron 1040 which then, e.g., uses variables from the pump neuron 1025 and its own activation function equations that model its physics properties to do the model equivalent of heating water. This, in turn, passes variables that heats up the heating coil neuron 1050. Heating coil neuron 1050 intakes air values along edge 1070 and produces hot air values 1080. The values 1080 may be the simulated demand curve 440 for this model. In some embodiments, this system would produce a neural network that used two control sequences as input, one for control neuron 1005, and one for control neuron 1030. It would produce one demand curve, the output from the heating coil neuron 1050.

In some implementations, some neurons within a neural network have many variables that are passed among the neurons, and have different (heterogenous) activation functions. For example, an exemplary boiler activation function may describe, using equations, the activation of a boiler, e.g., boiler neuron 1040. This may be, in whole or in part: inputPower=inputVoltage*inputCurrent; PLR=inputPower/Nominal power; Resistance Resistance=f(Nominal pressure drop, Nominal flow rate); Efficiency=f(Efficiency coefficients, PLR, nominal temperature); Power=f(PLR, Efficiency, Full load efficiency, Capacity); specificEnthalpy=f (input specificEnthalpy, Power, fluid flow rate); Pressure drop=f(Flow, resistance); Pressure=Pressure−Pressure drop, and so forth. Different neurons representing different resources will have different activation functions using equations to describe their function; e.g., how state moves through them.

Exemplary weight values in a neural network that might be used as variables in a activation neuron for a boiler may be: Nominal temperature; Nominal power; Full load efficiency; Nominal pressure drop; Nominal flow rate; inputPower=inputVoltage*inputCurrent; PLR=inputPower/Nominal power. These variables may arrive at the neuron through an edge from another neuron, or as an input. One neuron may send multiple variables to another neuron.

Exemplary equations to describe a pump that are used as an activation function in a neuron, e.g., pump neuron 1025 may be: Volume flow rate=f(qFlow, density); Volume flow rate ratio=Volume flow rate/Max volume flow rate; Shaft speed ratio=qAngularVelocity/Max shaft speed; Pressure head=pressure curve (Volume flow rate, shaft speed ratio, and so forth.

Exemplary weight values in a neural network that might be used as variables in an activation neuron for e.g., a pump may be: Properties Pressure curve points; Power curve points, Efficiency curve points, Max volume flow rate, Max pressure head, Max shaft speed, and so forth. At 410, a structure model is trained. FIG. 5A describes some aspects of training a structure model in more detail. At 435, an equipment model is trained. FIG. 5C describes some aspects of training an equipment model in more detail.

Figure 11:
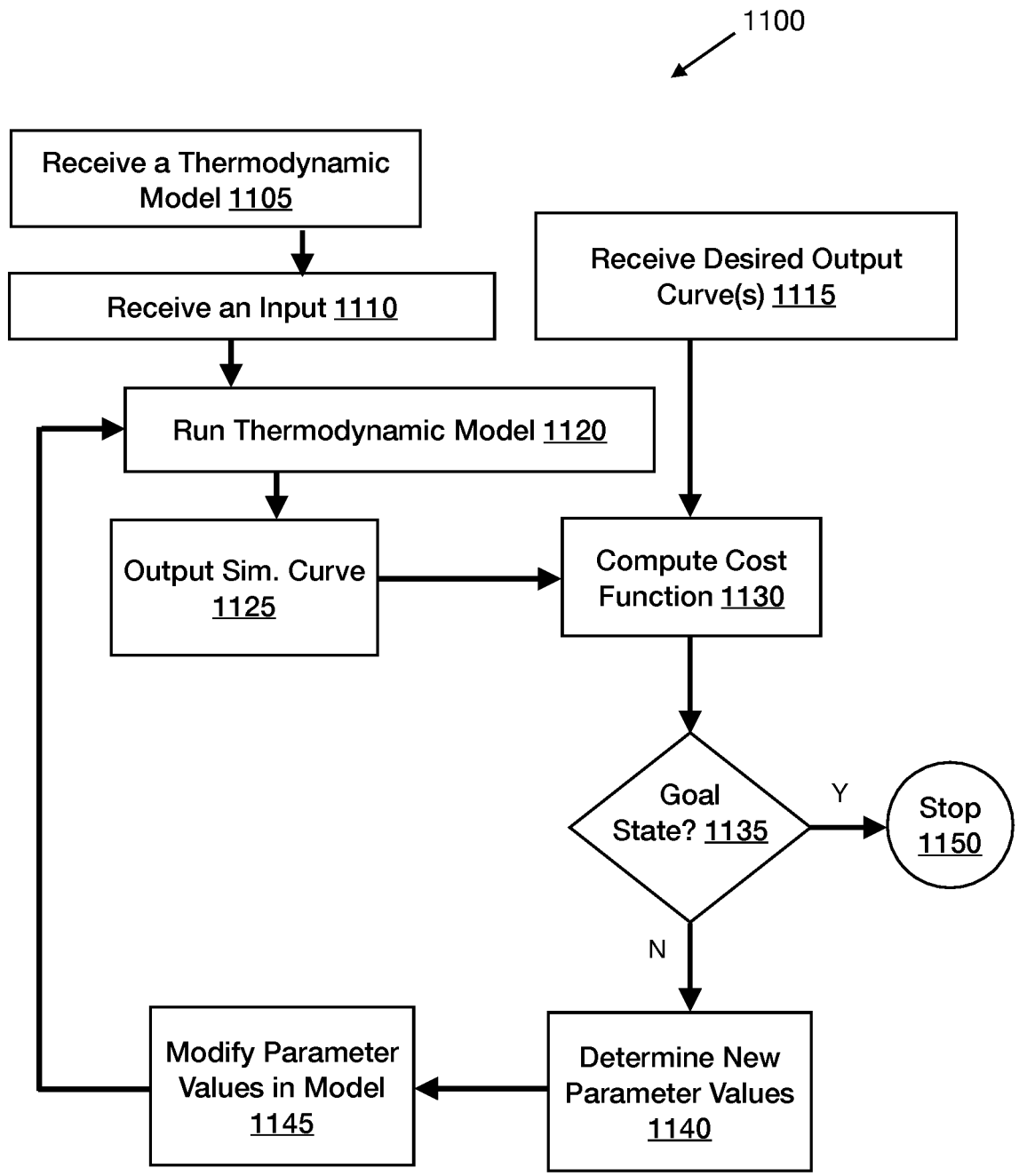
FIG. 11 depicts a method that can be used to train a model in accordance with one or more implementations.

FIG. 11 illustrates a method 1100 that trains a structure model, an equipment model, or a different sort of model. The operations of method 1100 presented below are intended to be illustrative. In some embodiments, method 1100 may be accomplished with one or more additional operations not described, and/or without one or more of the operations discussed. Additionally, the order in which the operations of method 1100 are illustrated in FIG. 11 and described below is not intended to be limiting.

In some embodiments, method 1100 may be implemented in one or more processing devices (e.g., a digital or analog processor, or a combination of both; a series of computer controllers each with at least one processor networked together, and/or other mechanisms for electronically processing information etc.) The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At operation 1105, a thermodynamic model is received. This thermodynamic model may be a structure model, an equipment model, or a different sort of model. The thermodynamic model may have been stored in memory, and so may be received from the processing device that the model is being run on. In some implementations, the thermodynamic model may be stored within a distributed system, and received from more than one processor within the distributed system, etc. A controlled device is a device that has controls, such as on-off switches, motors, variable controls, etc. such that a computer can modify its behavior. These controls may be wired, wireless, etc.

In some embodiments described herein, in a thermodynamic model, the fundamentals of physics are utilized to model component parts of a structure to be controlled as neurons in a thermodynamic neural network. Some neurons use physics equations as activation functions. Different types of neurons may have different equations for their activation functions, such that a thermodynamic model may have multiple activation functions within its neurons. When multiple components are linked to each other in a schematic diagram, a thermodynamic model is created that models the components as neurons. The values between the objects flow between the neurons as weights of connected edges. These neural networks may model not only the real complexities of systems but also their emergent behavior and the system semantics. Therefore, they may bypass two major steps of the conventional AI modeling approaches: determining the shape of the neural net, and training the neural net from scratch.

As the neurons are arranged in order of an actual system (or set of equations), as seen with reference to FIGS. 7 and 10, because the neurons themselves comprise an equation or a series of equations that describe the function of their associated object, and certain relationships between them are determined by their location in the neural net, a huge portion of training is no longer necessary, as the neural net itself comprises location information, behavior information, and interaction information between the different objects represented by the neurons. Further, the values held by neurons in the neural net at given times represent real-world behavior of the objects so represented. The neural net is no longer a black box but itself contains important information. This neural network structure also provides much deeper information about the systems and objects being described. Since the neural network is physics- and location-based, unlike the conventional AI structures, it is not limited to a specific model, but can run multiple models for the system that the neural network represents without requiring separate creation or training.

In some embodiments, the neural network that is described herein chooses the location of the neurons to tell you something about the physical nature of the system. The neurons are arranged in a way that references the locations of actual objects in the real work. The neural network also may use actual equations that can be used to determine object behavior into the activation function of the neuron. The weights that move between neurons may be equation variables that are used within the activation functions. Different neurons may have unrelated activation functions, depending on the nature of the model being represented. In an exemplary embodiment, each activation function in a neural network may be different.

As an exemplary embodiment shown with reference to FIGS. 8 and 10, a pump could be represented in a neural network as a network neuron with multiple variables (weights on edges), some variables that represent efficiency, energy consumption, pressure, etc. The neurons will be placed such that one set of weights (variables) feeds into the next neuron (e.g., with equation(s) as its activation function) that uses those variables. Unlike other types of neural networks, two required steps in earlier neural network versions—shaping the neural net, and training the model—may already be performed. Using embodiments discussed herein the neural net model need not be trained on some subset of information that is already known. In some embodiments, the individual neurons represent physical representations. Individual neurons may hold parameter values that help define the physical representation. As such, when the neural net is run, the parameters helping define the physical representation can be tweaked to more accurately represent the given physical representation.

This has the effect of pre-training the model with a qualitative set of guarantees, as the physics equations that describe objects being modeled are true, which saves having to find training sets and using huge amounts of computational time to run the training sets through the models to train them. A model does not need to be trained with information about the world that is already known. With objects connected in the neural net similar to how they are connected in the real world, emergent behavior arises in the model that, in certain cases, maps to the real world. This model behavior that is uncovered is often otherwise too computationally complex to determine. Further, the neurons represent actual objects, not just black boxes. The behavior of the neurons themselves can be examined to determine behavior of the object, and can also be used to refine the understanding of the object behavior. One example of heterogenous models is described in U.S. patent application Ser. No. 17/143,796, filed on Jan. 7, 2021, which is incorporated herein in its entirety by reference.

At operation 1110, an input is received. This input may be state data 505A that affects a system to be controlled 540A, it may be equipment action per control time series 505D, etc. Multiple inputs may be used, such that weather data 535A may also be used as input. Such weather data may have affected a structure during the time sensor data 545A, 520D has been gathered.

At operation 1115, the desired output curve(s) 520A are received. These are the curves that describe the state that a structure to be modeled 540A has registered over a defined period of time. This may be actual sensor 545A data gathered over the same time as the input, or simulated sensor data, for systems to be controlled that have yet to be built.

At operation 1120, a thermodynamic model is run. Running the model may entail feedforward—running the input though the model to the outputs over time T(0)-T(n), capturing state output values—within neurons that represent resources that modify state, within neurons that define structure thermodynamic values, etc.,—over the same time T(0)-T(n). At operation 1125, simulated output curve(s) 515A, 515D are output by the thermodynamic model. In some embodiments, the output curve is output successively in timesteps during the model run, in in some embodiments, other methods are used.

At operation 1130, a cost function is computed 530A, 530D using the desired output curve(s) 520A and the model output 515A or 520D and 515D. Details of the cost function are described elsewhere.

At operation 1135, a goal state is checked to determine if a stopping state has been reached. The goal state may be that the cost from the cost function is within a certain value, that the program has run for a given time, that the model has run for a given number of iterations, that a threshold value has been reached, such as the cost function should be equal or lower than the threshold value, or a different criterion may be used. If the goal state has not been reached, then a new set of inputs needs to be determined that are incrementally closer to an eventual answer—a lowest (or highest or otherwise determined) value for the cost function, as described elsewhere.

At operation 1140, if the goal state 1135 has determined that a stopping state 1150 has been reached, then the model has been substantially trained; that is, the output simulated curve is similar enough to the desired output curve within some range. This method can save as much as 30% of energy costs over adjusting the state when the need arises. If the goal state has not been reached, then the determine new parameter values step 1140, modify parameter values in model step 1145, the run thermodynamic model step 1120, the output simulation curve step 1125, and compute cost function step 1130 are iteratively performed, (520A, 520D) which incrementally optimizes the thermodynamic model as represented by the output simulated curve until the goal state 1135 is reached, at which point the simulation stops 1150.

New parameter values may be determined by using machine learning. Machine learning techniques may comprise determining gradients of the various variables within the thermodynamic model with respect to the cost function. Once the gradients are determined, gradient methods may be used to incrementally optimize the control sequences. The gradient at a location shows which way to move to minimize the cost function with respect to the inputs. In some embodiments, gradients of the internal variables with respect to the cost function are determined. In some embodiments, internal parameters of the neurons have their partial derivatives calculated. Different neurons may have different parameters. For example, a neuron modeling a pump may have parameters such as density, shaft speed, volume flow ratio, hydraulic power, etc. If the derivatives are differentiable, then backpropagation can be used to determine the partial derivatives, which gives the gradient.

After the gradients are determined, the parameter values are optimized to lower the value of the cost function with respect to the specific parameters. This process is repeated incrementally, as discussed elsewhere.

At operation 1145, the parameter values within the thermodynamic model that have been optimized are modified within the thermodynamic model. As these parameter values are within neurons, there is not a single input layer that is modified, rather, the individual parameter values that reside within neurons (as shown with reference to FIG. 8) are modified. These parameter values may be set up within the thermodynamic model as inputs to the individual neurons (e.g., 752, 760), then the inputs are changed to the new parameter values, or another method may be used, such as individually changing the parameter values through changing database values, etc.

After the parameter values within the thermodynamic model are modified, then the thermodynamic model is rerun with the new parameter values but the same input 505A, 505D. The thermodynamic model is rerun with new parameter values and the same input until the goal state is reached.

Figure 12:
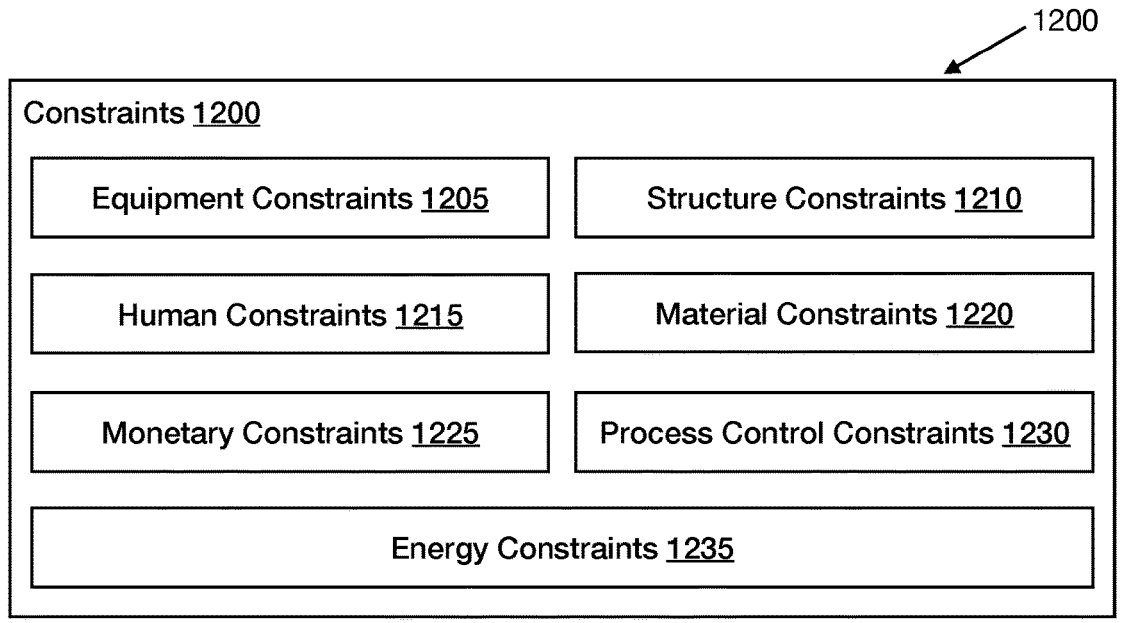
FIG. 12 is a block diagram that depicts some constraints in accordance with one or more implementations.

FIG. 12 depicts some possible constraints 1200 that can be used for a constraint state series curve. Constraint states are the preferred states of a space; i.e., all the other states are constrained. Equipment constraints 1205 may comprise using the equipment as little as possible, using selected resources as little as possible (e.g., a piece of equipment is beginning to show wear, so use of that piece of equipment is to be minimized), machines are turned on and off as few times as possible, etc. Structure constraints 1210 may be state associated with the building, or a zone in the building, such as temperature, humidity, etc. Some of these goals are interdependent. For example, how warm a person feels is a combination of temperature, humidity, and air flow, such that changing one variable (such as temperature) will change the allowable values in another variable (such as humidity). As such, when multiple state factors are considered, in some instances, many state variables may be looked at together to determine desired building constraints. Human constraints 1215 may comprise state values that humans find comfortable. A person (or an object) may have an ideal temperature at 70 degrees, for a specific example. However, how people experience temperature is dependent on more than just the straight temperature. It also depends on, e.g., humidity, air flow, radiant heat, and so on. Different state curves with different values may match the desired target path. For example, higher humidity and lower temperature may be equivalent with state curves modeling lower humidity and higher temperature. We combine all of this information to determine time-series comfort curves for different building zones. Different zones in a space may have different constraints.

Material constraints 1220 may be that certain resources are older, or in need of repair, so run those resources as little as possible. Monetary constraints 1225 may be constraints that will save money or cost money, such as certain resources may cost more to run, so run the resource as little as possible. Process control constraints 1230 may be turning the equipment on and/or off as infrequently as possible, using a specific resource as little or as much as possible, least equipment wear and tear, least cost for equipment changing state, etc. Energy cost constraints 1235 may be running with the lowest energy cost. A constraint system may use a constraint simulator, as described with reference to FIG. 13, which determines how multiple state curves fit a requirement and using this information in a neural network.

As a whole, ground truth time series may be considered constraint time series as the model is solved to optimize to the constraint implied by it, and any of the constraints mentioned in FIG. 1200 may be used, as is fitting. Constraints can also be used in the cost function, to determine what aspects should be minimized or maximized.

Figure 13:
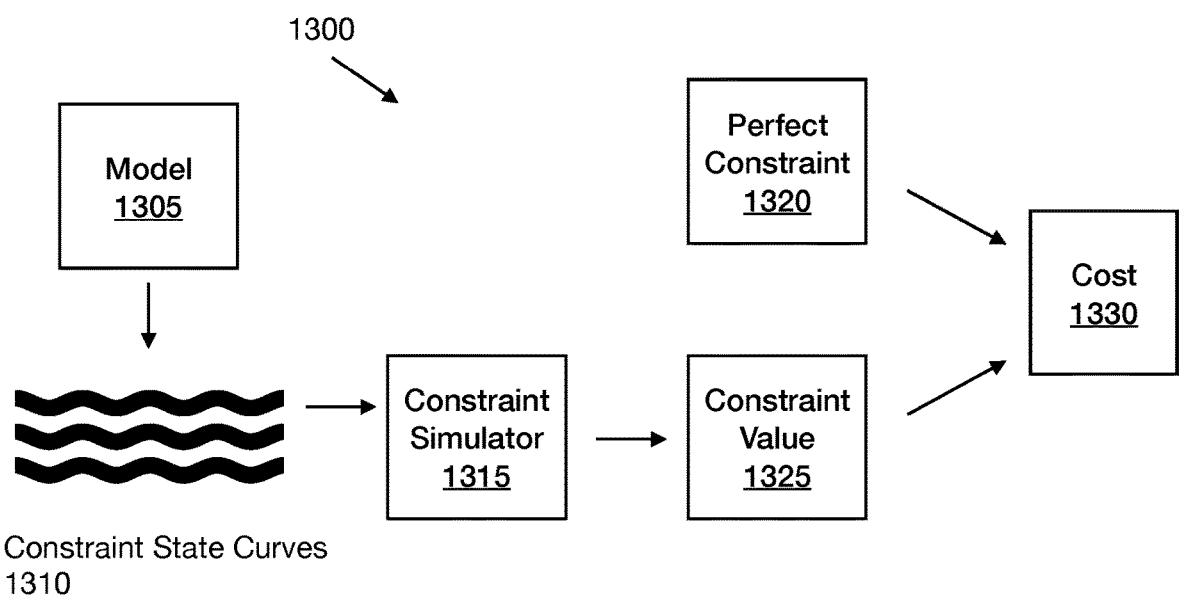
FIG. 13 is a flow diagram that depicts using a constraint simulator in accordance with one or more implementations.

FIG. 13 is a flow diagram 1300 that depicts using a constraint simulator in accordance with one or more implementations. When multiple values are used to determine a constraint, multiple constraint state curves may be necessary. For example, using monetary constraints to determine an optimal model state may comprise determining how much energy multiple resources used, and what the energy costs. A constraint simulator 1315 may be used to determine how these multiple constraint state curves 1310 reduce to the desired constraint. The constraint state curves may be state injection time series 315A, constraint state curves 305A, etc. The constraint simulator may be a neural network that can itself have the data from the constraint state curves feed forward to a constraint value 1325, and then to a cost 1330. The constraint value 1325 can be compared to a perfect constraint 1320—the ground truth. As an example, a comfort constraint simulator may have a constraint value from −3 to +3, with −3 being too cold, too humid, etc., and with +3 being too hot, too dry, etc. Perfect constraint, 1320 in this example, would be 0. The cost here is the difference between the constraint value 1325 and the perfect constraint 1320. Backpropagation starts at the cost 1330, works back through the constraint value 1325, the constraint simulator 1315, the model 1305, and then to the inputs.

Figure 14:
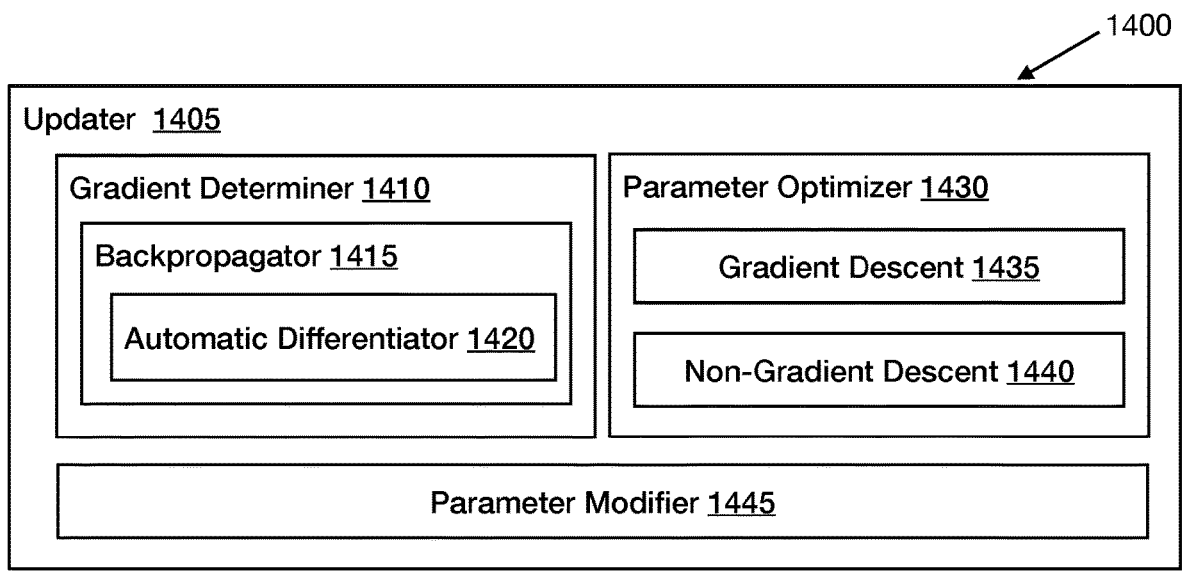
FIG. 14 is a block diagram that depicts an exemplary updater system in conjunction with which described embodiments can be implemented.

FIG. 14 is a block diagram 1400 of an exemplary updater, which a machine learning engine may use to update inputs/ values in a structure model and/or an equipment model. Updater 1305 techniques may comprise a gradient determiner 1410 that determines gradients of the various parameter values 800 within the thermodynamic model with respect to a cost. This allows incremental optimization of neuron input parameter values 800 using the gradients, as the gradients show which way to step to minimize the cost function with respect to at least some of the parameter values 800 of a model 340, 345, 1305. In some embodiments, the parameters values 800 of neurons have their partial derivatives calculated with relation to the cost. Different neurons may have different parameters. For example, a neuron modeling a pump may have parameters such as density, shaft speed, volume flow ratio, hydraulic power, etc. A neuron modeling a building portion, such as a wall layer, may have parameters such as thermal resistance, thermal conductivity, thermal capacitance, etc. Modifying values of such parameters modifies the way that state travels through the thermodynamic model, and so will tweak the thermodynamic model to more closely match the system to be controlled. To modify the parameter, the updater may change the parameter value within the thermodynamic model. It may do so by changing a database value, by changing an input value, if the parameter itself is an input to the thermodynamic model, or using another method known to those of skill in the art.

If the derivatives are differentiable, then a backpropagator 1415 may be used to determine the gradients. Backpropagation finds the derivative of the error (given by the cost function) for the parameters in the thermodynamic model, that is, backpropagation computes the gradient of the cost function with respect to the parameters within the network. Backpropagation calculates the derivative between the cost function and parameters by using the chain rule from the last neurons calculated during the feedforward propagation (a backward pass), through the internal neurons, to the first neurons calculated. In some embodiments, an automatic differentiator 1420 may use automatic differentiation (sometimes called "autodifferentiation") to find the gradients. According to Wikipedia, "automatic differentiation is accomplished by augmenting the algebra of real numbers and obtaining a new arithmetic. An additional component is added to every number to represent the derivative of a function at the number, and all arithmetic operators are extended for the augmented algebra." Other methods may be used to determine the parameter gradients. These include Particle Swarm and SOMA ((Self-Organizing Migrating Algorithm), etc. The backpropagation may determine a negative gradient of the cost function, as the negative gradient points in the direction of smaller values.

After the gradients are determined, a parameter optimizer 1430 optimizes the parameter value(s) 800 to lower the value of the cost function with respect to the parameter value(s). Many different optimizers may be used, which can be roughly grouped into 1) gradient descent optimizers 1435 and 2) non-gradient descent optimizers 1440. Among the gradient descent methods 1435 are standard gradient descent, stochastic gradient descent, and mini-batch gradient descent. Among the non-gradient descent methods 1440 are Momentum, Adagrad, AdaDelta, ADAM (adaptive movement estimation), and so on.

Figure 15:
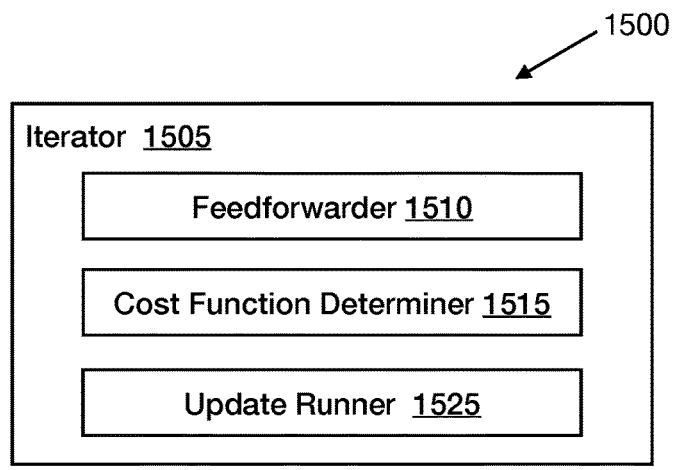
FIG. 15 is a block diagram that depicts an exemplary iterator system with which described embodiments can be implemented.

FIG. 15 is a block diagram 1500 that depicts an exemplary iterator system with which described embodiments can be implemented. An iterator 1505, using a feedforwarder, which might be part of a machine learning engine, feeds input forward 1510 through a model, e.g., FIGS. 7, 10, 13, etc. The iterator then uses a cost function determiner 1515 to determine how close a cost simulated through the model, e.g, 1325, is to a ground truth, e.g., a perfect constraint 1320. This cost value is then used by the Update Runner 1525 which runs the Updater 1405.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for creating equipment control sequences from constraint data comprising:
   accessing a first constraint state curve;
   accessing a structure model that thermodynamically represents a controlled space;
   accessing an equipment model associated with the controlled space that thermodynamically represents equipment associated with the controlled space;
   running the structure model using a machine learning engine that accepts a first state injection time series as input and outputs a second constraint state curve that is compared to the first constraint state curve to determine a first goal state; and
   running the equipment model using a machine learning engine that accepts a first control sequence as input and produces a second state injection time series as output that is compared to the first state injection time series to determine a second goal state.

2. The method of claim 1, wherein the equipment model comprises a first heterogenous neural network and wherein the structure model comprises a second heterogenous neural network.

3. The method of claim 1, wherein the equipment model comprises a neural network and wherein at least one neuron within the neural network comprises at least two activation functions.

4. The method of claim 3, wherein the structure model comprises a second neural network and wherein at least one neuron within the second neural network comprises at least two activation functions.

5. The method of claim 1, wherein the running the structure model comprises:
   iteratively:
      using the machine learning engine to determine a new state injection time series, and
      running the structure model using the new state injection time series as input,
   until a first goal state is met.

6. The method of claim 5, wherein running the structure model using the new state injection time series as input produces the second constraint state curve as output.

7. The method of claim 6, wherein the first goal state being met comprises after using the first constraint state curve and the second constraint state curve in a cost function, producing a cost, the cost being within a predefined range.

8. The method of claim 1, wherein running the equipment model comprises:
   iteratively:
      using the machine learning engine to determine a new control sequence, and running the equipment model using the new control sequence as input, and
      producing a second state injection time series,
   until a second goal state is met.

9. The method of claim 1, wherein the machine learning engine comprises at least two machine learning engines.

10. An automated building control system, comprising a controller with a processor and memory, the processor configured to perform automation building control steps which include:
   accessing a first constraint state curve;
   accessing a structure model that thermodynamically represents a controlled space;
   accessing an equipment model associated with the controlled space that thermodynamically represents at least one resource associated with the controlled space;
   running the structure model using a machine learning engine that accepts a first state injection time series as input and outputs a second constraint state curve that is compared to the first constraint state curve to determine a first goal state; and
   running the equipment model using a machine learning engine that accepts a first control sequence as input and produces a second state injection time series as output that is compared to the first state injection time series to determine a second goal state.

11. The system of claim 10, wherein the equipment model comprises a first neural network with neurons, where there are at least two resources and wherein the neurons are arranged with reference to physical connections of the resources.

12. The system of claim 10, wherein the first control sequence is operationally able to control the at least one resource associated with the controlled space.

13. The system of claim 10, wherein the structure model comprises a second neural network with neurons, and wherein the neurons are arranged with reference to location of physical structures in the controlled space.

14. The system of claim 13, wherein at least one of the neurons has at least two separate activation functions.

15. The system of claim 11, wherein at least one of the neurons has at least two separate activation functions.

16. A non-transitory computer-readable storage medium configured with data and instructions which upon execution by a processor perform a method of creating equipment control sequences from constraint data, the method comprising:
   accessing a first constraint state curve;
   accessing a structure model that thermodynamically represents a controlled space;
   accessing an equipment model associated with the controlled space that thermodynamically represents at least one resource associated with the controlled space;
   running the structure model using a machine learning engine that accepts a first state injection time series as input and outputs a second constraint state curve that is compared to the first constraint state curve to determine a first goal state; and
   running the equipment model using a machine learning engine that accepts a first control sequence as input and produces a second state injection time series as output that is compared to the first state injection time series to determine a second goal state.

17. The non-transitory computer-readable storage medium of claim 16, wherein the machine learning engine comprises using backpropagation that computes a cost function gradient for values in the structure model, and then uses an optimizer to update the first state injection time series.

18. The non-transitory computer-readable storage medium of claim 17, wherein the backpropagation that computes the cost function gradient uses automatic differentiation.

19. The non-transitory computer-readable storage medium of claim 16, wherein the equipment model comprises a neural network composed of neurons, and wherein at least one of the neurons has at least two separate activation functions.

20. The non-transitory computer-readable storage medium of claim 16, wherein there are multiple resources and wherein the equipment model comprises a neural network with neurons, and wherein the neurons are arranged with reference to connections between the multiple resources in the controlled space.

* * * * *